United States Patent
Wu et al.

(10) Patent No.: US 11,323,921 B2
(45) Date of Patent: *May 3, 2022

(54) METHOD, SYSTEM, AND DEVICE FOR USER DETACHMENT WHEN A HANDOVER OR CHANGE OCCURS IN HETEROGENEOUS NETWORK

(71) Applicant: HUAWEI TECHNOLOGIES CO., LTD., Guangdong (CN)

(72) Inventors: Wenfu Wu, Shanghai (CN); Weihua Hu, Shanghai (CN); Shanshan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

This patent is subject to a terminal disclaimer.

(21) Appl. No.: 16/903,250

(22) Filed: Jun. 16, 2020

(65) Prior Publication Data

US 2020/0314699 A1 Oct. 1, 2020

Related U.S. Application Data

(63) Continuation of application No. 16/366,983, filed on Mar. 27, 2019, now Pat. No. 10,701,594, which is a (Continued)

(30) Foreign Application Priority Data

Aug. 7, 2007 (CN) .......................... 200710137568.8

(51) Int. Cl.
*H04W 36/00* (2009.01)
*H04W 76/32* (2018.01)
*H04W 36/14* (2009.01)

(52) U.S. Cl.
CPC ....... *H04W 36/0005* (2013.01); *H04W 76/32* (2018.02); *H04W 36/14* (2013.01)

(58) Field of Classification Search
CPC . H04W 36/0005; H04W 76/32; H04W 36/14; H04W 36/0079; H04W 36/305;
(Continued)

(56) References Cited

U.S. PATENT DOCUMENTS 3,663,762 A 5/1972 Amos, Jr.
5,870,400 A 2/1999 Van Loon et al.
(Continued)

FOREIGN PATENT DOCUMENTS

CN 1878389 A 12/2006
CN 1881919 A 12/2006
(Continued)

OTHER PUBLICATIONS

Boufidis, Zachos, et al. "End-to-end architecture for cognitive reconfigurable wireless networks." 2007 16th IST Mobile and Wireless Communications Summit. IEEE, 2007. (Year: 2007).*
(Continued)

*Primary Examiner* — Sharad Rampuria
(74) *Attorney, Agent, or Firm* — James Anderson Harrison

(57) ABSTRACT

A method for user detachment when a handover or change occurs in a heterogeneous network is provided. The method includes: a user equipment (UE) is handed over or switched from a source network to a target network; a network element on a network side determines whether to detach the UE from the source network, and if yes, the network element on the network side detaches the UE from the source network. A system and a device for user detachment when a handover or change occurs in a heterogeneous network,
(Continued)

and another method for user detachment when a handover or change occurs in a heterogeneous network are also provided.

20 Claims, 10 Drawing Sheets

Related U.S. Application Data continuation of application No. 16/025,798, filed on Jul. 2, 2018, now Pat. No. 10,251,096, which is a continuation of application No. 14/670,048, filed on Mar. 26, 2015, now Pat. No. 10,028,173, which is a continuation of application No. 13/952,938, filed on Jul. 29, 2013, now Pat. No. 9,155,000, which is a continuation of application No. 12/479,216, filed on Jun. 5, 2009, now Pat. No. 8,521,163, which is a continuation of application No. PCT/CN2008/071842, filed on Jul. 31, 2008.

(58) Field of Classification Search
CPC ... H04W 36/30; H04W 36/18; H04W 36/125; H04W 36/12; H04W 36/08
See application file for complete search history.

(56) References Cited

U.S. PATENT DOCUMENTS

| | | | |
|---|---|---|---|
| 6,931,249 B2 | 8/2005 | Fors et al. | |
| 7,801,074 B2 | 9/2010 | Kim et al. | |
| 8,027,688 B2 | 9/2011 | Wu | |
| 8,031,677 B1 | 10/2011 | Wu et al. | |
| 8,144,665 B2 | 3/2012 | Hu et al. | |
| 8,165,061 B2 | 4/2012 | Verma et al. | |
| 8,165,068 B2 | 4/2012 | Zhao et al. | |
| 8,249,037 B2 | 8/2012 | Bachmann et al. | |
| 8,270,978 B1 | 9/2012 | Faccin et al. | |
| 8,374,173 B2 | 2/2013 | Sedlacek et al. | |
| 8,457,635 B2 | 6/2013 | Bachmann et al. | |
| 8,559,387 B2 | 10/2013 | Dwyer et al. | |
| 8,681,739 B1 | 3/2014 | Zhao et al. | |
| 8,774,818 B2 | 7/2014 | Lim et al. | |
| 8,910,271 B2 | 12/2014 | Rajadurai et al. | |
| 8,989,124 B1 | 3/2015 | Ramamurthy et al. | |
| 9,225,399 B2 | 12/2015 | Shan et al. | |
| 9,888,426 B2 | 2/2018 | Ulupinar et al. | |
| 10,251,096 B2 | 4/2019 | Wu et al. | |
| 10,701,594 B2 * | 6/2020 | Wu | H04W 76/32 |
| 2003/0153309 A1 | 8/2003 | Bjelland et al. | |
| 2004/0029587 A1 | 2/2004 | Hulkkonen et al. | |
| 2006/0030319 A1 | 2/2006 | Chou et al. | |
| 2006/0032695 A1 | 2/2006 | Lohmann et al. | |
| 2006/0146803 A1 | 7/2006 | Bae et al. | |
| 2006/0153124 A1 | 7/2006 | Kant et al. | |
| 2006/0268944 A1 | 11/2006 | Xu | |
| 2008/0181178 A1 | 7/2008 | Shaheen | |
| 2008/0188223 A1 | 8/2008 | Vesterinen et al. | |
| 2008/0304454 A1 | 12/2008 | Zhong et al. | |
| 2008/0305825 A1 | 12/2008 | Shaheen | |
| 2008/0316971 A1 | 12/2008 | Shaheen | |
| 2008/0320149 A1 | 12/2008 | Faccin | |
| 2009/0042576 A1 | 2/2009 | Mukherjee et al. | |
| 2009/0129342 A1 * | 5/2009 | Hwang | H04W 36/0022 370/331 |
| 2009/0176496 A1 | 7/2009 | Li et al. | |
| 2009/0232022 A1 | 9/2009 | Savolainen et al. | |
| 2009/0238207 A1 | 9/2009 | Zhao et al. | |
| 2009/0286527 A1 | 11/2009 | Cheon et al. | |
| 2010/0135245 A1 | 6/2010 | Zhu et al. | |
| 2011/0244865 A1 | 10/2011 | Wu et al. | |
| 2014/0198637 A1 | 7/2014 | Shan et al. | |
| 2015/0045049 A1 | 2/2015 | Sawai | |
| 2015/0215823 A1 | 7/2015 | Qu et al. | |
| 2016/0323800 A1 | 11/2016 | Ulupinar et al. | |

FOREIGN PATENT DOCUMENTS

| | | |
|---|---|---|
| CN | 101369912 A | 2/2009 |
| EP | 1713207 A1 | 10/2006 |
| EP | 2007160 A1 | 12/2008 |
| RU | 2237381 C2 | 9/2004 |
| RU | 2006106235 A | 6/2006 |
| WO | 2005027563 A1 | 3/2005 |
| WO | 2006029663 A1 | 3/2006 |
| WO | 2006088331 A1 | 8/2006 |
| WO | 2007024115 A1 | 3/2007 |
| WO | 2007049936 A1 | 5/2007 |
| WO | 2009018762 A1 | 2/2009 |

OTHER PUBLICATIONS

Olmos, J., et al. "A Functional End-to-End QoS Architecture Enabling Radio and IP Transport Coordination." 2007 IEEE Wireless Communications and Networking Conference. IEEE, 2007. (Year: 2007).*

S2-072596_Detach CATT, et al.,Detach Procedure,3GPP TSG SA WG2 Architecture S2#58,Jun. 25-29, 2007, Orlando, FL, USA,total 6 pages.

S2-072558 Huawei,"Attach Type in attach procedure",3GPP TSG SA WG2 Architecture S2#58,Jun. 25-29, 2007, Orlando, FL, USA,total 5 pages.

23402v121-clean 3GPP TS 23.402 V1.2.1 (Aug. 2007),3rd Generation Partnership Project;Technical Specification Group Services and System Aspects;Architecture Enhancements for non-3GPP accesses(Release 8),total 57 pages.

29213-800 3GPP TS 29.213 V8.0.0 (May 2008),3rd Generation Partnership Project;Technical Specification Group Core Network and Terminals;Policy and Charging Control signalling flows and QoS parameter mapping;(Release 8),total 65 pages.

23402v110-clean 3GPP TS 23.402 V1.1.0 (Jun. 2007),3rd Generation Partnership Project;Technical Specification Group Services and System Aspects;Architecture Enhancements for non-3GPP accesses(Release 8),total 50 pages.

3GPP TS 23.060 V8.1.0 (Jun. 2008),3rd Generation Partnership Project;Technical Specification Group Services and System Aspects;General Packet Radio Service (GPRS);Service description;Stage 2(Release 8),total 259 pages.

XP002567857 3GPP TS 23.402 V1.2.0 (Jul. 2007),3rd Generation Partnership Project;Technical Specification Group Services and System Aspects;Architecture Enhancements for non-3GPP accesses(Release 8),total 54 pages.

XP002508153 3GPP TS 23.401 V1.1.0 (Jul. 2007) 3rd Generation Partnership Project;Technical Specification Group Services and System Aspects;GPRS enhancements for E-UTRAN access(Release 8),total 78 pages.

NSN677-1012_23060-460 3GPP TS 23.060 V4.6.0 (Sep. 2002),3rd Generation Partnership Project;Technical Specification Group Services and System Aspects;General Packet Radio Service (GPRS); Service description;Stage 2 (Release 4),total 201 pages.

NSN677-1014_32251-730 3GPP TS 32.251 V7.3.0 (Mar. 2007),3rd Generation Partnership Project;Technical Specification Group Services and System Aspects;Telecommunication management;Charging management;Packet Switched (PS) domain charging(Release 7),total 60 pages.

NSN677-1016_23401-800 3GPP TS 23.401 V8.0.0 (Dec. 2007),3rd Generation Partnership Project;Technical Specification Group Services and System Aspects;General Packet Radio Service (GPRS) enhancements forEvolved Universal Terrestrial Radio Access Network(E-UTRAN) access(Release 8),total 167 pages.

NSN677-1018 32423-740 3GPP TS 32.423 V7.4.0 (Dec. 2006),3rd Generation Partnership Project;Technical Specification Group Services and System Aspects;Telecommunication management;Subscriber and equipment trace: Trace data definition and management(Release 7),total 52 pages.

NSN677-1050-21900-600 3GPP TR 21.900 V6.0.0 (Sep. 2003),3rd Generation Partnership Project;Technical Specification Group Services and System Aspects;Technical Specification Group working methods(Release 5),total 33 pages.

(56) References Cited

OTHER PUBLICATIONS

"www.3gpp.org-/ftp/tsg_ sa/WG2_Arch/TSGS2_58_ Orlando/ Docs/," NSN677-1013(Jan. 9, 2017),total 12 pages.
"3GPP FAQs; The Mobile Broadband Standard," 3GPP, http://www.3gpp.org/contact/3gpp-faqs, NSN677-1011 (Sep. 22, 2016),total 10 pages.
"Delegates Corner; Information about TSGs or WGs; The Mobile Broadband Standard;GPRS," 3GPP,http://www.3gpp.org/specificationsgroups/delegatescorner, NSN677-1010 (Jan. 10, 2017),total 5 pages.
"About 3GPP Home; The Mobile Broadband Standard; UMTS," 3GPP, http://www.3gpp.org/about3gpp/about3gpp, NSN677-1009 (Jan. 10, 2017),total 4 pages.
TMOBILE_00171835 Kumar et al.,"Evolution of Mobile Wireless Communication Networks: 1G to 4G", InternationalJournal of Electronics andCommunications Technology( Kumar et al. ),total 5 pages.
TMOBILE_00172334 Rajiv Chakravorty et al., "Performance Issues with Vertical Handovers Experiences from GPRS Cellular and WLAN Hot-spots Integration", Proc. IEEE PerCom, 2004 ( Chakravorty et al. ),total 11 pages.
TMOBILE_00171496 George Lampropoulos et al., "Handover Management Architectures in Integrated WLAN/Cellular Networks", IEEE Communications Surveys and Tutorials, vol. 7, Issue 4, 33-44, Feb. 13, 2006 ( Lampropoulos et al. ),total 15 pages.
TMOBILE_00184711 Hyeyeon Kwon et al.,"Consideration of UMTS-WLAN Seamless Handover", Proceedings of the Seventh IEEE International Symposium on Multimedia, 2005 ( Kwon et al. ),total 6 pages.
TMOBILE_00183494 Nguyen-Vuong et al.,"An Architecture for UMTS-WIMAX Interworking", IEEE (2006) ( Nguyen-Vuong et al. ),total 10 pages.
TMOBILE_00172163 Alsenmyr et al.,"Handover between WCDMA and GSM", Ericsson ( Alsenmyr et al. ),total 6 pages.
TMOBILE_00171511 Jaseemuddin,"An Architecture for Integrating UMTS and 802.11 WLAN Networks", Ryerson University ( Jaseemuddin ),total 8 pages.
TMOBILE_00185092 S2-073008 NEC,"High-level Information flows for handover between 3GPP and non-3GPP accesses",3GPP TSG SA WG2 Architecture S2#58,Jun. 25-29, 2007,Orlando, FL, USA,total 5 pages.
TMOBILE_00187872 S2-073002 NEC,"High-level Information flows for handover between 3GPP and non-3GPP accesses",3GPP TSG SA WG2 Architecture S2#58,Jun. 25-29, 2007,Orlando, FL, USA,total 5 pages.
TMOBILE_00187850 S2-072960 Catt et al.,"Detach Procedure",3GPP TSG SA WG2 Architecture S2#58,Jun. 25-29, 2007,Orlando, FL, USA,total 7 pages.
TMOBILE_00187833 S2-072603 Catt,"EPS bearer release procedure during handover from 3GPP to non 3GPP",3GPP TSG SA WG2 Architecture S2#58,Jun. 25-29, 2007,Orlando, FL, USA,total 7 pages.
TMOBILE_00187822 S2-072497 IPWireless et al.,"Detach Procedure without IP connectivity release",3GPP TSG SA WG2 Architecture S2#58,Jun. 25-29, 2007,Orlando, USA,total 5 pages.
TMOBILE_00187751 S2-072252 Motorola,"Handover from non-3GPP Access to E-UTRAN (TS 23.402)",3GPP TSG SA WG2 Architecture S2#57,Apr. 23-27, 2007,Beijing, China,total 6 pages.
TMOBILE_00187739 S2-072202 Intel,"Handover from 3GPP Access (UTRAN) to non-3GPP Access (TS 23.402)",3GPP TSG SA WG2 Architecture S2#57,Apr. 23-27, 2007,Beijing, China,total 3 pages.
TMOBILE_00187717 S2-072192 Azaire Networks,"EUTRAN Untrusted non-3GPP Access Networks Handovers",3GPP TSG SA WG2 Architecture S2#57,Apr. 23-27, 2007,Beijing, China,total 4 pages.
TMOBILE_00187715 S2-072188 Qualcomm Europe et al.,"Principles for handover between 3GPP and non-3GPP accesses",3GPP TSG SA WG2 Architecture S2#57,Apr. 23-27, 2007,Beijing, China,total pages.

S2-072110 Starent, Sprint,"Handover Scenarios between 3GPP (E-UTRAN) and non-3GPP Access systems using S2c Reference Point",3GPP TSG SA WG2 Architecture S2#57,Apr. 23-27, 2007,Beijing, China,total 10 pages.
TMOBILE_00187645 S2-072109 Ericsson et al.,"Mobility between 3GPP and un-trusted non-3GPP accesses using S2c", 3GPP TSG SA WG2 Architecture S2#57,Apr. 23-27, 2007,Beijing, China,total 8 pages.
TMOBILE_00187626 S2-072099 Starent et al.,"Handover Scenarios between 3GPP (EUTRA) and non-3GPP Access systems using S2a Reference Point with PMIP6",3GPP TSG SA WG2 Architecture S2#57,Apr. 23-27, 2007, Beijing, Republic of China ,total 9 pages.
TMOBILE_00187614 S2-071907 Intel,"Handover from 3GPP Access (UTRAN) to non-3GPP Access (TS 23.402)",3GPP TSG SA WG2 Architecture S2#57,Apr. 23-27, 2007,Beijing, China,total 3 pages.
TMOBILE_00187559 S2-071688 Huawei et al.,"PDN Gateway selection",3GPP TSG SA WG2 Architecture S2#57,Apr. 23-27, 2007,Beijing, China,total 3 pages.
TMOBILE_00187550 S2-071590 Drafting Group,"Dedicated Bearer Activation, Modification and Deactivation Signalling Procedures",3GPP TSG SA WG2 Architecture S2#56c Rel-8 Ad-hoc,Mar. 26-30, 2007,Warsaw, Poland ,total 9 pages.
TMOBILE_00187537 S2-071431 Panasonic,"3GPP to non-3GPP handover",3GPP TSG SA WG2 Architecture S2#56c Rel-8 Ad-hoc,Mar. 26-30, 2007,Warsaw, Poland,total 3 pages.
TMOBILE_00187515 S2-071338 Telecom Italia,"AAA impacts on inter-system handover latency",3GPP TSG SA WG2 Architecture S2#56c Rel-8 Ad-hoc,Mar. 26-30, 2007,Warsaw, Poland,total 3 pages.
TMOBILE_00187499 S2-071290 Samsung,"Analysis of HO procedure between LTE and trusted non-3GPP system",3GPP TSG SA WG2 Architecture S2#56c Rel-8 Ad-hoc,Mar. 26-30, 2007,Warsaw, Poland,total 8 pages.
TMOBILE_00187490 S2-071262 NTT DoCoMo,"SAE GW resolution mechanism considering 3GPP-non3GPP mobility",3GPP TSG SA WG2 Architecture S2#56c Rel-8 Ad-hoc,Mar. 26-30, 2007,Warsaw, Poland,total 9 pages.
TMOBILE_00187486 S2-071209 Ericsson,"Discussion on PDN SAE GW identity registration in HSS",3GPP TSG SA WG2 Architecture S2#56c Rel-8 Ad-hoc,Mar. 26-30, 2007,Warsaw, Poland,total 4 pages.
TMOBILE_00187483 S2-071148 Qualcomm Europe,"Information flows for handover between 3GPP and non-3GPP accesses",3GPP TSG SA WG2 Architecture S2#56c Ad-hoc,Mar. 26-30, 2007,Warsaw, Poland,total 3 pages.
TMOBILE_00187477 S2-071132 Huawei,"Handover from non 3GPP to 3GPP",3GPP TSG SA WG2 Architecture S2#56c Rel-8 Ad-hoc ,Mar. 26-30, 2007,Warsaw, Poland,total 4 pages.
TMOBILE_00187383 S2-070667 Intel ,"3GPP to Non-3GPP Access Handover Using PMIP",3GPP TSG SA WG2 Architecture S2#56b Rel-8 Ad-hoc,Feb. 12-15, 2007,St Louis, Missouri, USA,total 2 pages.
TMOBILE_00187378 S2-070269 Intel et al.,"3GPP to Non-3GPP Handover Procedure (TS 23.402)",3GPP TSG SA WG2 Architecture S2#5615—Jan. 19, 2007,Florence, Italy,total 3 pages.
TMOBILE_00187302 S2-060484 NTT DoCoMo, Inc.,"Proposed architecture for inter access system handover between 3GPP and non-3GPP access systems",3GPP TSG SA WG2 Architecture S2#50,Jan. 16-20, 2006, Budapest, Hungary,total 7 pages.
TMOBILE_00187262 S2-060051 Azaire Networks,"Mobility support between pre-SAE/LTE 3GPP and non-3GPP access system without Mobile IP",3GPP TSG SA WG2 Architecture SA2#50, Jan. 16 20, 2006,Budapest, Hungary,total 14 pages.
TMOBILE_00184152 Secretary of 3GPP TSG-SA WG2,"Draft Report of SA WG2 Meeting#58"—Version 1.0.0 Approved at SA WG2 meeting #59, 3GPP TSG SA WG2 Architecture S2#58,Jun. 25 29, 2007,Orlando, FL, USA , total 123 pages.
NSNHTM0000074903 S2-072302 Secretary of 3GPP TSG-SA WG2,"Draft Report of SA WG2 meeting #57",3GPP TSG SA WG2 Architecture S2#57,Jun. 25-29, 2007,Orlando, FL, USA,total 90 pages.

(56) References Cited

OTHER PUBLICATIONS

TMOBILE_00203833 fD.3.5 fD.3.5 3GPP TR 23.882 V1.9.0 (Mar. 2007),3rd Generation Partnership Project;Technical Specification Group Services and System Aspects;3GPP System Architecture Evolution:Report on Technical Options and Conclusions(Release 7) ,total 200 pages.

NSNHTM0000095947 3GPP TS 23.060 V7.0.0 (Mar. 2006),3rd Generation Partnership Project;Technical Specification Group Services and System Aspects;General Packet Radio Service (GPRS);Service description;Stage 2(Release 7), otal 212 pages.

TMOBILE_00203467 3GPP TS 22.278 V8.2.0 (Jun. 2007),3rd Generation Partnership Project;Technical Specification Group Services and System Aspects;Service requirements for evolution of the 3GPP system (Release 8),total 17 pages.

R2-071328 Ericsson,"Handling of UE capability information in SAE/LTE",3GPP TSG-RAN WG2 #57-bis,St. Julian, Malta, Mar. 26-30, 2007,total 4 pages.

S2-073098_S2-072960-rev3 Catt et al,"Detach Procedure",3GPP TSG SA WG2 Architecture S2#58,Jun. 25-29, 2007 ,Orlando, FL, USA,total 7 pages.

S2-072912 IPWireless et al.,"Detach Procedure without IP connectivity release",3GPP TSG SA WG2 Architecture S2#58,Jun. 25-29, 2007,Orlando, USA,total 5 pages.

\* cited by examiner

METHOD, SYSTEM, AND DEVICE FOR USER DETACHMENT WHEN A HANDOVER OR CHANGE OCCURS IN HETEROGENEOUS NETWORK

CROSS-REFERENCE TO RELATED APPLICATIONS

This application is a continuation of U.S. patent application Ser. No. 16/366,983, filed on Mar. 27, 2019, which is a continuation of U.S. patent application Ser. No. 16/025,798, filed on Jul. 2, 2018, which is a continuation of U.S. patent application Ser. No. 14/670,048, filed on Mar. 26, 2015. The patent application Ser. No. 14/670,048 is a continuation of U.S. patent application Ser. No. 13/952,938, filed on Jul. 29, 2013, now U.S. Pat. No. 9,155,000, which is a continuation of U.S. patent application Ser. No. 12/479,216, filed on Jun. 5, 2009, now U.S. Pat. No. 8,521,163 which is a continuation of International Patent Application No. PCT/CN2008/071842, filed on Jul. 31, 2008. The International Patent Application claims priority to Chinese Patent Application No. 200710137568.8, filed on Aug. 7, 2007. All of the afore-mentioned patent applications are hereby incorporated by reference in their entireties.

FIELD OF THE TECHNOLOGY

The present disclosure relates to the network communication technology and more particularly to a method, system, and device for user detachment when a handover or change occurs in a heterogeneous network.

BACKGROUND

To improve the competitiveness of networks in the future, a new evolution network is now researched for a 3rd-generation partnership project (3GPP) network. FIG. 1 is a schematic structural view of an evolution network system for a 3GPP network. The system includes: an evolved UMTS terrestrial radio access network (E-UTRAN), for implementing all functions related to the wireless feature of the evolution network; a mobility management entity (MME), for mobility management of a control plane, including management of a user context and a mobility state and allocation of temporary user identities; a serving gateway (serving GW) entity, for acting as a user plane anchor point between access networks of the 3GPP network for terminating the E-UTRAN; a packet data network gateway (PDN GW) entity, for acting as a user anchor point between an access network of the 3GPP network and an access network of a non-3GPP network, and an interface for terminating the external PDN; a policy and charging rule function (PCRF) entity, for implementing functions of policy control decision and flow-based charging control; and a home subscriber server (HSS), for storing subscription information of users.

The UMTS terrestrial radio access network (UTRAN) or GSM/EDGE radio access network (GERAN) implements all functions relevant to the wireless feature of the existing UMTS/GPRS network; a serving GPRS supporting node (SGSN) implements functions of route forwarding, mobility management, session management, and user information storage in the GPRS/UMTS network.

IP access networks of the non-3GPP network mainly include access networks defined by non-3GPP network organizations, for example, wireless local area network (WLAN), worldwide interoperability for microwave access (Wimax), and code division multiple access (CDMA) network.

An authentication, authorization, and accounting server (AAA server) mainly implements access authentication, authorization, and accounting for user equipment (UE).

It should be noted that, the schematic structural view of FIG. 1 is not the only schematic structural view of the evolution network system for a 3GPP network. The evolution network of a 3GPP network may have various structures.

One requirement on the evolution network of a 3GPP network is to realize the handover or switching of the UE between a 3GPP network and a non-3GPP network. FIG. 2 is a flow chart of a process that the UE is handed over or switched from a 3GPP network to a non-3GPP network in the prior art. The process includes the following steps.

In Step 201, the UE accesses the 3GPP network through a serving GW and a PDN GW.

In FIG. 2, the mobility management network element (MME) and the serving GW belong to the 3GPP network, a non-3GPP GW belongs to the non-3GPP network, and the PDN GW and HSS/AAA server are common network elements shared by the 3GPP network and the non-3GPP network.

In Step 202, the UE triggers the handover or switching from the 3GPP network to the non-3GPP network.

In Step 203, the UE sends an Access Request message to the non-3GPP GW, and requests to access the non-3GPP GW.

As for a WLAN system, the non-3GPP GW in this step is an evolved packet data gateway (EPDG); as for a Wimax system, the non-3GPP GW in this step is an access service network gateway (ASN GW); and as for a CDMA system, the non-3GPP GW is an access gateway (AGW).

In Step 204, an access authentication process is performed between the UE, the non-3GPP GW, and the HSS/AAA server, and the non-3GPP GW obtains the PDN GW address information used by the UE.

In Step 205a, the non-3GPP GW sends a proxy binding update message to the PDN GW.

In this step, it is assumed that an interface protocol between the non-3GPP GW and the PDN GW is the proxy mobile internet protocol (PMIP). If an interface protocol between the UE and the PDN GW is the client mobile internet protocol (CMIP), Step 205a is replaced by Step 205b, in which the UE sends a binding update message to the PDN GW.

In Step 206a, the PDN GW sends a proxy binding acknowledgement message to the non-3GPP GW.

In this step, it is assumed that the interface protocol between the non-3GPP GW and the PDN GW is the PMIP. If the interface protocol between the UE and the PDN GW is the CMIP, Step 206a is replaced by Step 206b, in which the PDN GW sends a binding Ack message to the UE.

In Step 207, the non-3GPP GW returns an access accept message to the UE.

In Step 208, the PDN GW sends a delete bearer request message to the serving GW, and the serving GW sends the delete bearer request message to the MME.

In Step 209, the MME deletes bearer resources related to the UE, returns a delete bearer response message to the serving GW, and the serving GW returns the delete bearer response message to the PDN GW.

The above flow is a specific example of the process that the UE is handed over or switched from a 3GPP network to a non-3GPP network. Certainly, the handover or change process is not limited to the above descriptions. A 3GPP network involved in the handover or change may be GERAN, UTRAN, or EUTRAN. A non-3GPP network involved in the handover or change may be WLAN, Wimax, or CDMA system.

Once the UE accesses a 3GPP network, the 3GPP network creates bearer resources of the UE and a mobility management context of the UE. The mobility management context of the UE exists in the MME. Furthermore, bearer resources of a 3GPP network and a mobility management context of a 3GPP network are also created in the UE. Therefore, when the UE is handed over or switched from a 3GPP network to a non-3GPP network, user detachment needs to be performed to save network resources. The user detachment includes detachment of the 3GPP network and detachment of the UE. The detachment of the 3GPP network indicates that the 3GPP network deletes the bearer resources of the UE and the mobility management context of the UE, and the detachment of the UE indicates that the UE deletes the bearer resources of the 3GPP network and the mobility management context of the 3GPP network. Here, the mobility management context of the UE exists in the MME.

However, in the process shown in FIG. 2, when the UE is handed over or switched from a 3GPP network to a non-3GPP network, the 3GPP network merely deletes the bearer resources of the UE, but does not delete the mobility management context of the UE, and meanwhile, the UE does not delete the bearer resources and mobility management context of the 3GPP network as well.

As known from the above that, the prior art neither provides a method for 3GPP network detachment when the UE is handed over or switched from a 3GPP network to a non-3GPP network, nor provides a specific method for user detachment of the UE when the UE is handed over or switched from a 3GPP network to a non-3GPP network. That is to say, no specific solution for user detachment when handover or change occurs in a heterogeneous network is provided in the prior art.

In addition, if the UE has a single radio capability, that is, the UE can access only one network, after the UE is handed over or switched from a 3GPP network to a non-3GPP network, user detachment needs to be performed, that is, the 3GPP network needs to detach the UE, and the UE needs to be detached from the 3GPP network. The detaching, by the 3GPP network, the UE includes that the 3GPP network deletes the bearer resources of the UE on the 3GPP network side, and the mobility management context of the UE in the MME. The detaching, by the UE, from the 3GPP network includes that the UE deletes the bearer resources and mobility management context created when the UE accesses the 3GPP network.

If the UE has a dual radio capability, that is, the UE can access two networks at the same time, after the UE is handed over or switched from a 3GPP network to a non-3GPP network, it is judged whether the 3GPP network needs to detach the UE according to, for example, information of operator policies. In other words, the prior art does not provide a solution for determining whether to perform the user detachment when the UE is handed over or switched from a 3GPP network to a non-3GPP network.

To sum up, during researches and applications, the inventor(s) of the present disclosure finds that the prior art has at least the following problems: the prior art neither provides a specific solution for user detachment when a handover or change occurs in a heterogeneous network, nor provides a solution for judging whether to perform user detachment when handover or change occurs in a heterogeneous network.

SUMMARY

An embodiment of the present disclosure provides a method for detaching a user when a handover or change occurs in a heterogeneous network.

An embodiment of the present disclosure further provides another method for detaching a user when a handover or change occurs in a heterogeneous network.

An embodiment of the present disclosure provides a system for detaching a user when a handover or change occurs in a heterogeneous network.

An embodiment of the present disclosure provides a device for detaching a user when a handover or change occurs in a heterogeneous network.

An embodiment of the present disclosure further provides a device for detaching a user when a handover or change occurs in a heterogeneous network.

A method for detaching a user when handover or change occurs in a heterogeneous network includes the following steps.

First, a UE is handed over or switched from a source network to a target network.

Next, a network element on a network side determines whether to detach the UE from the source network; if yes, the UE is detached from the source network.

Another method for user detachment when a handover or change occurs in a heterogeneous network includes the following steps.

First, a UE triggers handover or switching from a source network to a target network.

Next, the UE determines whether to be detached from the source network; if yes, the UE is detached from the source network.

A system for user detachment when a handover or change occurs in a heterogeneous network includes a UE and a network side.

The UE is adapted to be handed over or switched from a source network on the network side to a target network on the network side.

The network side is adapted to hand over or switch the UE from the source network to the target network, and detach the UE from the source network.

A device for detaching a user when a handover or change occurs in a heterogeneous network includes a second handover or change module and a second detachment module on a network side.

The second handover or switching module is adapted to hand over or switch a UE from a source network on the network side to a target network on the network side.

The second detachment module is adapted to detach the UE from the source network.

A device for detaching a user when a handover or change occurs in a heterogeneous network includes a first handover or change module and a first detachment module in a UE.

The first handover or change module is adapted to hand over or switch the UE from a source network to a target network;

The first detachment module is adapted to detach the UE from the source network.

As known from the above solutions that, in the embodiments of the present disclosure, when a handover or change occurs in the heterogeneous network, the UE is detached from the source network after being determined by the source network or the UE is detached from the source network after being determined by the UE. Thus, detachment of the user is realized by the source network or the UE, when the handover or change occurs in the heterogeneous network.

DETAILED DESCRIPTION

To make the objectives, technical solutions, and beneficial effects of the present disclosure more comprehensible, the present disclosure is described in detail below with reference to the accompanying drawings and embodiments.

FIGS. 6-10 respectively show the first to fifth examples of a method for user detachment when a handover or change occurs in a heterogeneous network according to an embodiment of the present disclosure. The main ideas of the examples are described as follows:

The UE is handed over or switched from a source network to a target network; the source network determines whether to detach the UE from the source network; if yes, the UE will be detached from the source network; otherwise, the UE will not be detached from the source network.

Figure 11:
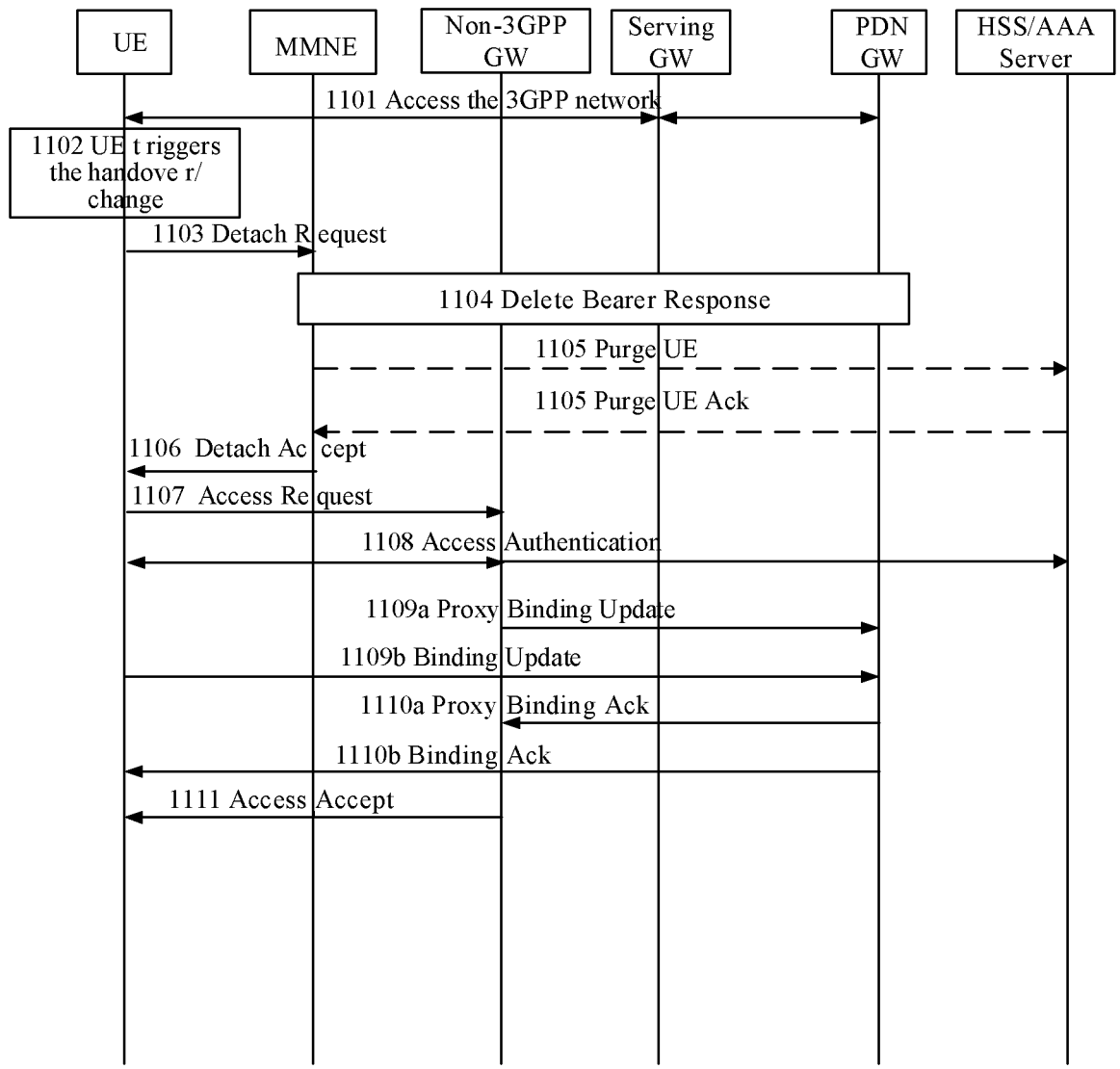
FIG. 11 shows a sixth example of the method for user detachment when a handover or change occurs in a heterogeneous network according to an embodiment of the present disclosure.

FIG. 11 shows a sixth example of a method for user detachment when a handover or change occurs in a heterogeneous network according to an embodiment of the present disclosure. The main idea of this example is described as follows.

The UE triggers a handover or switching from a source network to a target network; the UE determines whether to be detached from the source network; if yes, the UE will be detached from the source network; otherwise, the UE will not be detached from the source network.

The two networks involved in the handover or change in the heterogeneous network according to the embodiments of the present disclosure may be one of the 3GPP networks (such as a GERAN network, a UTRAN network, or an EUTRAN network) and one of the non-3GPP networks (such as a WLAN network, Wimax network, or CDMA network). Specifically, the embodiments include the handover or switching of the UE from a 3GPP network to a non-3GPP network or the handover or switching of the UE from a non-3GPP network to a 3GPP network. Here, the network where the UE originally exists during the handover or change process is referred to as the source network, and the other network involved in the handover or change process is referred as the target network.

Then, the handover or switching from a 3GPP network to a non-3GPP network is taken as an example to illustrate the first embodiment to the sixth embodiment of the method for UE detachment when a handover or change occurs in the heterogeneous network of the present disclosure.

Figure 3:
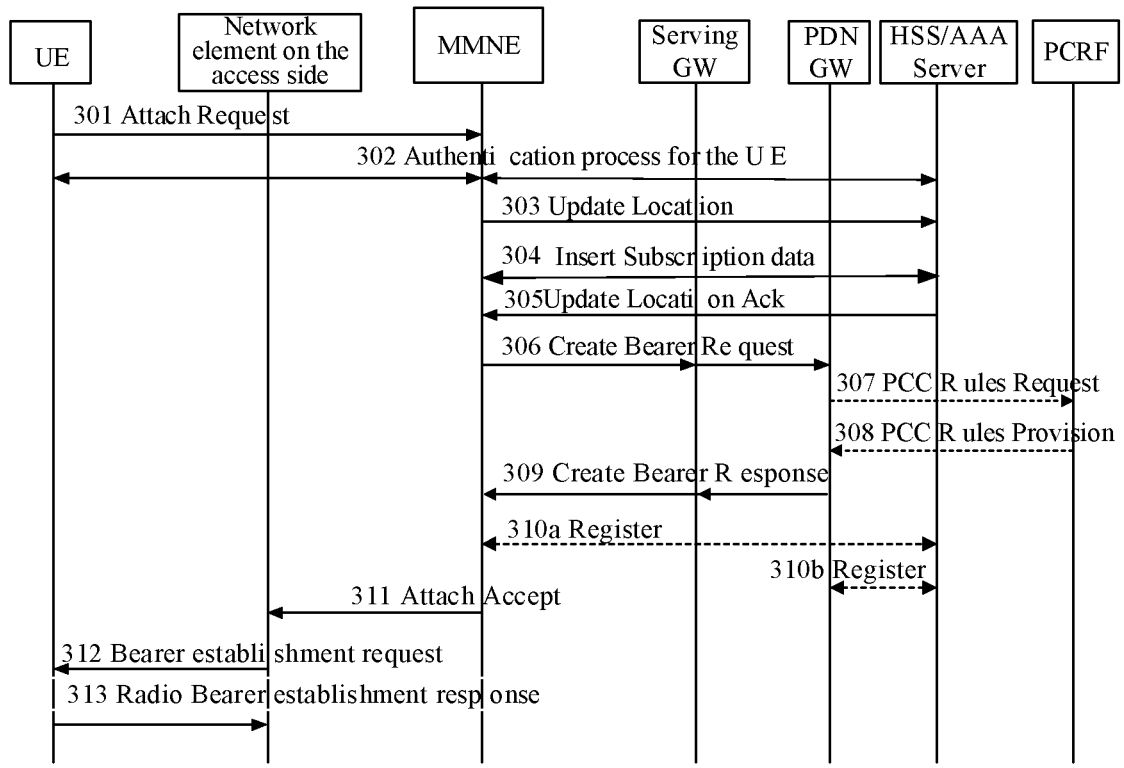
FIG. 3 is a flow chart of a process that a network element in a 3GPP network acquires terminal capability of UE and access policy information of an operator when the UE accesses the 3GPP network according to an embodiment of the present disclosure.
Figure 4:
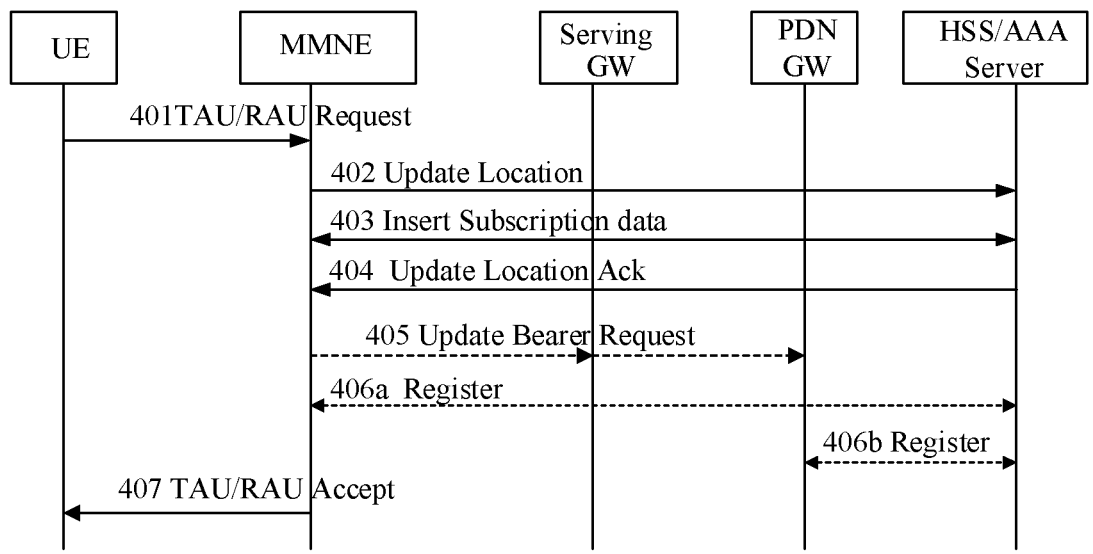
FIG. 4 is a flow chart of a process that a network element in a 3GPP network acquires terminal capability of UE and access policy information of an operator when a location area or terminal capability of the UE changes according to an embodiment of the present disclosure.

The UE and the network element in the 3GPP network acquire the terminal capability of the UE, and the network element obtains access policy information of the operator, which are provided for being used in the solution for UE detachment when the UE is handed over or switched from the 3GPP network to the non-3GPP network according to the embodiments of the present disclosure. Here, FIGS. 3 and 4 are used to illustrate the process that the network element in a 3GPP network acquires the terminal capability of the UE and the access policy information of the operator according to the embodiments of the present disclosure. FIG. 3 is a flow chart of a process that a network element in a 3GPP network acquires terminal capability of UE and access policy information of an operator when the UE accesses the 3GPP network. FIG. 4 is a flow chart of a process that a network element in a 3GPP network acquires terminal capability of UE and access policy information of an operator when a location area or terminal capability of the UE changes after the UE accesses the 3GPP network according to an embodiment of the present disclosure.

Referring to FIG. 3, the process that the network element in the 3GPP network acquires the terminal capability of the UE and the access policy information of the operator when the UE accesses the 3GPP network includes the following steps.

In step 301, the UE sends an attach request message carrying terminal capability of the UE to the MME.

In this step, if the access network of the UE is GERAN/UTRAN, the SGSN serves as the MME; if the access network of the UE is EUTRAN, the MME serves as the MME.

In this step, the terminal capability of the UE is represented by information element (IE) of the radio capability supported by the UE. The radio capability supported by the UE is a single radio capability (which indicates that the UE can access only one network at a certain time point) or a dual radio capability (which indicates that the UE can access two or more networks at a certain time point). An exemplary structure of the IE carrying the radio capability supported by the UE is listed as follows. The IE includes a radio capability parameter supported by the UE. The parameter may be: 1) the UE has a single radio capability; 2) the UE has a dual radio capability.

```
<UE Network Capability value part> ::=
UE Support Radio Capability
......
UE Support Radio Capability
0 Single Radio Capability
1 Dual Radio Capability
```

In step 302, the UE, the MME, and the HSS/AAA server implement an authentication process of the UE to authenticate the UE.

In step 303, if the MME finds that the UE is in an invalid state, the MME sends an update location message to the HSS/AAA server, and registers the UE with the HSS/AAA server. The update location message carries the terminal capability of the UE.

In this step, if the access policy information of the operator is configured in the MME, the update location request may carry the access policy information of the operator. The access policy information of the operator includes: 1) a single radio access, that is, the UE can access only one access network at a certain time point; and 2) a dual radio access, that is, the UE can access a plurality of access networks at a certain time point.

In step 304, the HSS/AAA server inserts subscription data of a user into the MME.

In this step, if the access policy information of the operator is configured or subscribed in the HSS/AAA server, the HSS/AAA server carries the access policy information of the operator in the subscription data, and sends the subscription data to the MME.

In step 305, the HSS/AAA server returns an update location Ack message to the MME.

In Step 306, the MME sends a create bearer request message to the serving GW, and the serving GW sends the create bearer request message to the PDN GW.

In this step, the MME initiates a default bearer establishment process, so as to create a default bearer of the UE in the MME, serving GW, and PDN GW. The create bearer request message further carries a bearer type IE. The MME uses the bearer type IE to notify the created bearer type to the serving GW and the PDN GW. If the MME sets the bearer type IE to default bearer, the serving GW and the PDN GW are notified that the created bearer is a default bearer.

In this step, the terminal capability of the UE and the access policy information of the operator are carried in the create bearer request message and sent to the serving GW and the PDN GW.

Steps 307 and 308 are performed only when the policy and charging rules used by the default bearer need to be obtained from the PCRF, and the access policy information of the operator is configured in the PCRF.

In step 307, the PDN GW sends a PCC rules request message to the PCRF to obtain the policy and charging rules used by the default bearer.

In step 308, the PCRF returns a PCC rules provision message to the PDN GW, and the PCC rules provision message carries the access policy information of the operator.

In step 309, the PDN GW and the serving GW create a bearer context, and sets the created bearer as the default bearer; the PDN GW returns a create bearer response message to the serving GW, and the serving GW returns the create bearer response message to the MME.

If the access policy information of the operator is configured in the PCRF entity, or the access policy information of the operator is configured in the PDN GW, or the access policy information of the operator is configured in the serving GW, this step includes the following: the create bearer response message carries the access policy information of the operator configured by the PCRF, the PDN GW, or the serving GW.

In this step, the bearer context created by the PDN GW and the serving GW includes bearer type information, which has two values: default bearer and dedicated bearer. For the default bearer, the PDN GW and the serving GW set the bearer type information in the bearer context to default bearer. The PDN GW and the serving GW may know that the created bearer is a default bearer in the following two manners.

1) In step 306, the MME carries the bearer type IE in the create bearer request message, and notifies the bearer type to the serving GW and the PDN GW through the bearer type IE. If the carried bearer type IE set by the MME is in the value of default bearer, the created bearer is the default bearer.

2) The serving GW and the PDN GW determine whether the created bearer is the first bearer created in the packet data network (PDN); if yes, the serving GW and the PDN GW determine that the created bearer is a default bearer.

Other bearers are dedicated bearers. In this case, the serving GW and the PDN GW set the bearer type information in the bearer context to dedicated bearer.

Step 310a is performed only when the access network type (RAT type) information in the 3GPP network has been registered with the HSS/AAA server by the MME.

In step 310a, the MME registers access situations of the UE in the 3GPP network (for example, the RAT type used by the UE) with the HSS/AAA server.

Step 310b is performed only when the RAT type information of the UE in the 3GPP network has been registered with the HSS/AAA server by the PDN GW.

In step 310b, the PDN GW registers the access situations of the UE in the 3GPP network (for example, the RAT type used by the UE) with the HSS/AAA server.

Through this step, the HSS/AAA server obtains the access network situations of the UE. For example, in this embodiment, the HSS/AAA server knows that the RAT type of the UE is a 3GPP network type, or a specific network type in a 3GPP network.

The RAT type of the UE includes the following two situations.

1) The RAT type of the UE is categorized into a 3GPP network and a non-3GPP network.

2) The RAT type of the UE is a specific network type used by the UE, for example, GERAN network, UTRAN network, EUTRAN network, WLAN network, Wimax network, CDMA network, etc.

In Step 311, the MME returns an Attach Accept message to a network element on an access side, and the Attach Accept message carries information of the radio bearer to be established by the UE.

As for the EUTRAN access network, the network element on the access side is ENodeB; as for the UTRAN access network, the network element on the access side is RNC; as for the GERAN access network, the network element on the access side is BSS. The MME may carry the access policy information of the operator in the Attach Accept message.

In step 312, the network element on the access side sends a bearer establishment request message to the UE, and requests the UE to establish a radio bearer. The message carries the access policy information of the operator sent by the MME.

The access policy information of the operator may also be notified to the UE in a broadcast message of a cell.

In step 313, the UE establishes the bearer context, sets the created bearer to a default bearer, and returns a radio bearer establishment response message to the network element on the access side.

The UE adds bearer type information to the established bearer context, and the bear type has the following two values: default bearer and dedicated bearer. For the default bearer, the UE sets the bearer type information in the bearer context to default bearer. The bearer type added to the established bearer context by the UE may be acquired through the following manners.

1) In step 311, the MME carries a bearer type IE in the Attach Accept message, and notifies the bearer type to the UE by the network element on the access side through the bearer type IE. For the default bearer, the value of the bearer type IE carried by the MME is Default Bearer.

2) The UE determines whether the created bearer is the first bearer created in the PDN; if yes, the UE determines that the created bearer is a default bearer.

Other bearers are dedicated bearers. In this case, the UE sets the bearer type information in the bearer context to dedicated bearer.

In this embodiment, it should be noted that, the HSS and the AAA server may be configured in different entities or in a same entity. If the HSS and the AAA server are configured in different entities, the register message sent by the PDN GW in step 310a is forwarded to the HSS by the AAA server, and the register message sent by the MME in step 310b is forwarded to the AAA server by the HSS.

FIG. 4 is a flow chart of a process that a network element in a 3GPP network acquires terminal capability of UE and access policy information of an operator when a location area or terminal capability of the UE changes. The process includes the following steps.

In step 401, the UE sends a tracking area update or routing area update request (TAU/RAU request) message carrying changed terminal capability of the UE to the MME.

If the access network of the UE is GERAN/UTRAN, the message sent by the UE is the RAU request message; if the access network of the UE is EUTRAN, the message sent by the UE is the TAU request message.

The terminal capability of the UE is represented by IEs of the radio capability supported by the UE. The radio capability supported by the UE is a single radio capability (which indicates that the UE can access only one network at a certain time point) or a dual radio capability (which indicates that the UE can access two or more networks at a certain time point). An exemplary structure of the IE carrying the radio capability supported by the UE is listed as follows. The IE includes a radio capability parameter supported by the UE. The parameter may be: 1) the UE has a single radio capability; 2) the UE has a dual radio capability.

```
<UE Network Capability value part> ::=
    UE Support Radio Capability
    ......
    UE Support Radio Capability
    0 Single Radio Capability
    1 Dual Radio Capability
```

In step 402, the MME sends an update location message to the HSS/AAA server, and registers the UE with the HSS/AAA server, in which the update location message carries the changed terminal capability of the UE.

In this step, if the access policy information of the operator is configured in the MME, the update location request message carries the access policy information of the operator. The access policy information of the operator includes: 1) a single radio access, that is, the UE can access only one access network at a certain time point; and 2) a dual radio access, that is, the UE can access a plurality of access networks at a certain time point.

In step 403, the HSS/AAA server inserts subscription data of a user into the MME.

In this step, if the access policy information of the operator is configured or subscribed in the HSS/AAA server, the HSS/AAA server delivers the changed access policy information of the operator to the MME.

In Step 404, the HSS/AAA server returns an update location Ack message to the MME.

In Step 405, when the MME determines that the access policy information of the operator and the terminal capability of the UE has changed, the MME sends an update bearer request message to the serving GW, and the serving GW sends the update bearer request message to the PDN GW, in which the update bearer request message carries the changed access policy information of the operator and the changed terminal capability of the UE.

In this step, the changed access policy information of the operator and the changed terminal capability of the UE are notified to the serving GW and the PDN GW.

Step 406a is performed only when the RAT type information in the 3GPP network has been registered with the HSS/AAA server by the MME and the information has changed.

In Step 406a, the MME registers the access situations of the UE in the 3GPP network (for example, the RAT type used by the UE) with the HSS/AAA server.

Step 406b is performed only when the RAT type information in the 3GPP network has been registered with the HSS/AAA server by the PDN GW and the information has changed.

In step 406b, if the RAT type information in the 3GPP network has been registered with the HSS/AAA server by the PDN GW and the information has changed, the PDN GW registers the access situations of the UE in the 3GPP network (for example, the RAT type used by the UE) with the HSS/AAA server.

In step 407, the MME returns a TAU/RAU accept message to the UE, and the MME may deliver the changed access policy information of the operator to the UE in the TAU/RAU accept message.

The changed access policy information of the operator may also be notified to the UE in a broadcast message of the cell.

FIG. 4 shows the process that the network element in a 3GPP network acquires the changed terminal capability of the UE and the changed access policy information of the operator when the terminal capability of the UE and the access policy information of the operator both have changed. The process that the network element in the 3GPP network acquires the changed terminal capability of the UE or the changed access policy information of the operator when the terminal capability of the UE or the access policy information of the operator has changed is similar to the process of FIG. 4, which thus is not described in detail here.

Figure 5:
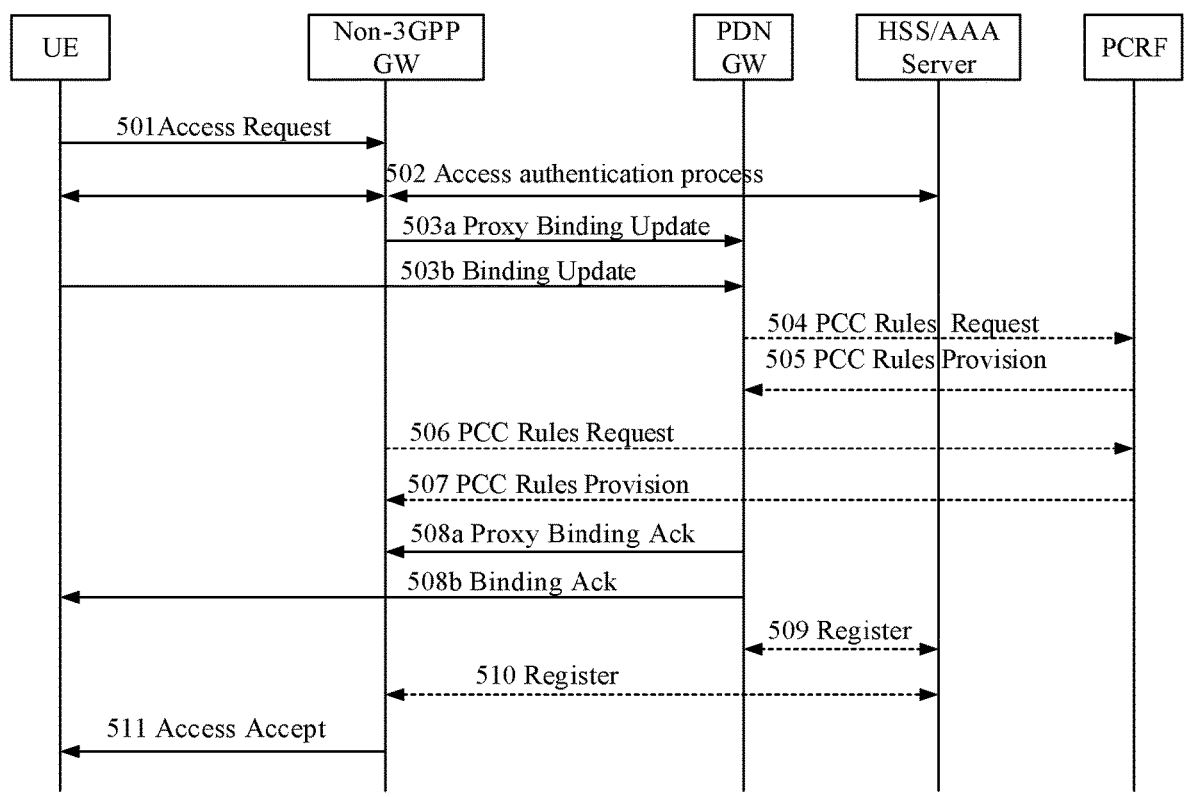
FIG. 5 is a flow chart of a process that a network element in a non-3GPP network acquires terminal capability of UE and access policy information of an operator when the UE accesses the non-3GPP network according to an embodiment of the present disclosure.

The UE and the network element in a non-3GPP network acquire the terminal capability of the UE, and the network element acquires the access policy information of the operator, which are provided for being used in the solution for UE detachment when the UE is handed over or switched from the non-3GPP network to a 3GPP network according to the embodiments of the present disclosure. FIG. 5 is used to illustrate the process that the network element in a non-3GPP network acquires the terminal capability of the UE and the access policy information of the operator according to the embodiments of the present disclosure. FIG. 5 is a flow chart of a process that a network element in a non-3GPP network acquires terminal capability of UE and access policy information of an operator when the UE accesses the non-3GPP network.

Referring to FIG. 5, the process that the network element in the non-3GPP network acquires the terminal capability of the UE and the access policy information of the operator when the UE accesses the non-3GPP network includes the following steps.

In step 501, the UE sends an access request message carrying the terminal capability of the UE to a non-3GPP GW.

In this step, if the non-3GPP network is a WLAN network, the non-3GPP GW is an EPDG; if the non-3GPP network is a Wimax network, the non-3GPP GW is an ASN GW; and if the non-3GPP network is a CDMA network, the non-3GPP GW is an AGW.

In this step, the terminal capability of the UE is represented by IEs of the radio capability supported by the UE. The radio capability supported by the UE is a single radio capability (which indicates that the UE can access only one network at a certain time point) or a dual radio capability (which indicates that the UE can access two or more networks at a certain time point). An exemplary structure of the IE carrying the radio capability supported by the UE is listed as follows. The IE includes a radio capability parameter supported by the UE. The parameter may be: 1) the UE has a single radio capability; 2) the UE has a dual radio capability.

---

<UE Network Capability value part> ::=
UE Support Radio Capability
......
UE Support Radio Capability
0 Single Radio Capability
1 Dual Radio Capability

---

In step 502, an authentication process is performed between the UE, the non-3GPP GW, and the HSS/AAA server.

In this step, if the access policy information of the operator is configured in the non-3GPP GW, an access authentication message may carry the access policy information of the operator to the HSS/AAA server. The access policy information of the operator includes: 1) a single radio access, that is, the UE can access only one access network at a certain time point; and 2) a dual radio access, that is, the UE can access a plurality of access networks at a certain time point. In this step, if the access policy information of the operator is configured in the HSS/AAA server, the access authentication message may carry the access policy information of the operator to the non-3GPP GW.

In step 503a, the non-3GPP GW sends a proxy binding update message to the PDN GW.

In this step, it is assumed that an interface protocol between the non-3GPP GW and the PDN GW is the proxy mobile internet protocol (PMIP). If an interface protocol between the UE and the PDN GW is the client mobile internet protocol (CMIP), step 503a is replaced by step 503b, in which the UE sends a binding update message to the PDN GW.

In this step, the terminal capability of the UE and the access policy information of the operator may be carried in the proxy binding update message or the binding update message and sent to the PDN GW.

In step 504, if the policy and charging rules used by the UE need to be obtained from the PCRF, the PDN GW sends a PCC rules request message to the PCRF to obtain the policy and charging rules used by the UE.

In step 505, the PCRF provides a PCC rules provision message of the policy and charging rules used by the UE to the PDN GW. If the access policy information of the operator is configured in the PCRF, the PCRF transmits the access policy information of the operator to the PDN GW via the PCC rules provision message.

In step 506, if the policy and charging rules used by the UE need to be obtained from the PCRF, the non-3GPP GW sends a PCC rules request message to the PCRF to obtain the policy and charging rules used by the UE.

In step 507, the PCRF provides a PCC rules provision message of the policy and charging rules used by the UE to the non-3GPP GW. If the access policy information of the operator is configured in the PCRF, the PCRF transmits the access policy information of the operator to the non-3GPP GW via the PCC rules provision message.

In step 508a, the PDN GW sends a proxy binding Ack message to the non-3GPP GW.

In this step, it is assumed that the interface protocol between the non-3GPP GW and the PDN GW is the PMIP. If the interface protocol between the UE and the PDN GW is the CMIP, step 508a is replaced by step 508b, in which the PDN GW sends a binding Ack message to the UE.

In step 509, if the RAT type information in the non-3GPP network is registered with the HSS/AAA server by the PDN GW, the PDN GW registers the access situations of the UE in the non-3GPP network (for example, the RAT type used by the UE) with the HSS/AAA server.

In step 510, if the RAT type information in the non-3GPP network is registered with the HSS/AAA server by the non-3GPP GW, the non-3GPP GW registers the access situations of the UE in the non-3GPP network (for example, the RAT type used by the UE) with the HSS/AAA server.

Through step 509 or step 510, the HSS/AAA server obtains the access network situations of the UE. For example, in this embodiment, the HSS/AAA server knows that the RAT type of the UE is a non-3GPP network type, or a specific network type in the non-3GPP network. This step is optional.

The RAT type used by the UE may be processed through the following two manners.

1) The RAT type used by the UE is categorized into a 3GPP network and a non-3GPP network.

2) The RAT type used by the UE is a specific network type used by the UE, for example, a GERAN network, a UTRAN network, an EUTRAN network, a WLAN network, Wimax network, or a CDMA network.

In step 511, the non-3GPP GW returns an access accept message to the UE. The non-3GPP GW may carry the access policy information of the operator in the access accept message.

In this embodiment, it should be noted that, the HSS and the AAA server may be configured in different entities or in the same entity. If the HSS and the AAA server are configured in different entities, the register message sent by the PDN GW in step 509 is forwarded to the HSS by the AAA server, and the register message sent by the non-3GPP GW in Step 510 is forwarded to the AAA server by the HSS.

Figure 6:
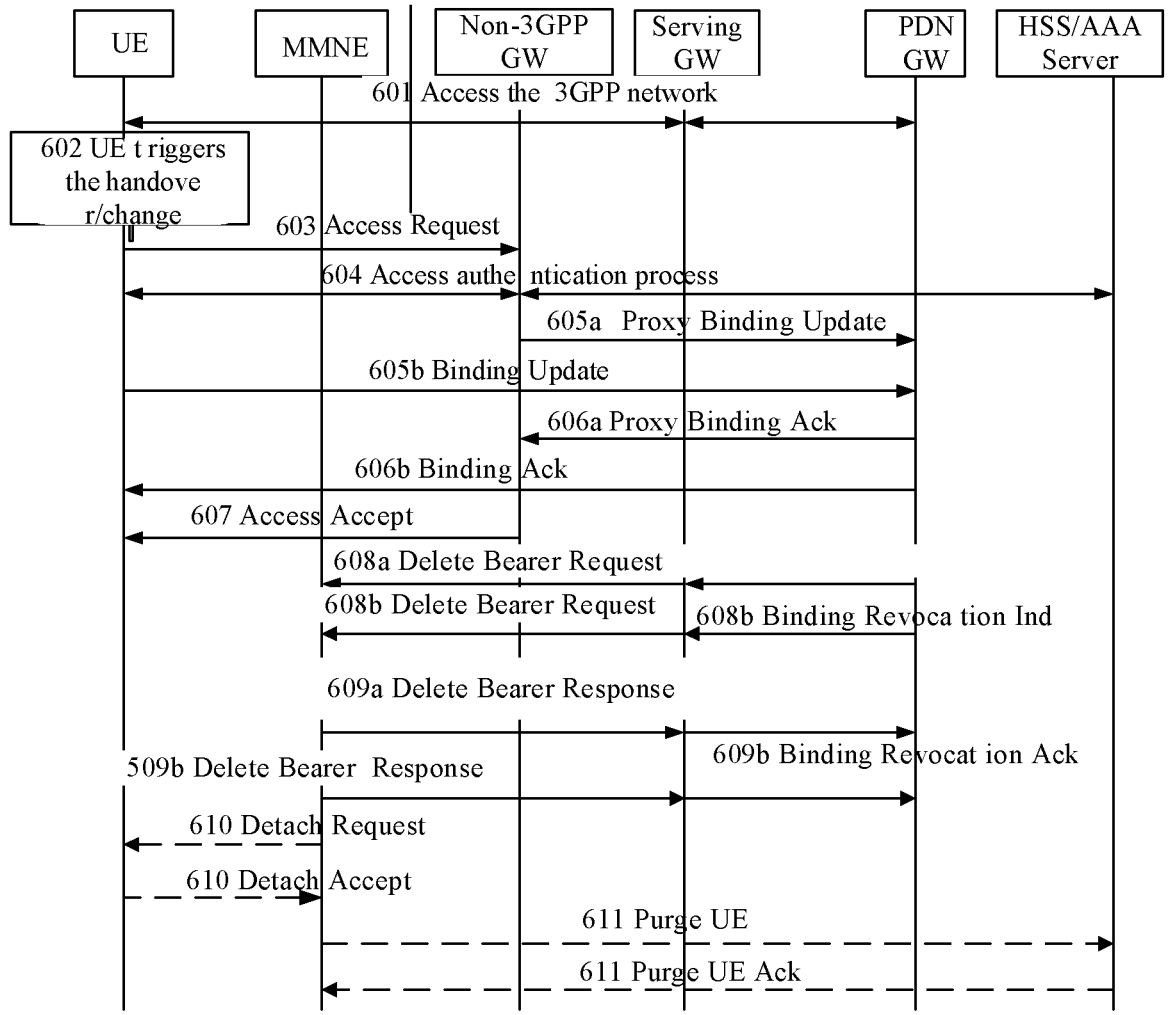
FIG. 6 shows a first example of a method for user detachment when a handover or change occurs in a heterogeneous network according to an embodiment of the present disclosure.

FIG. 6 shows a first example of a method for detaching a user when a handover or change occurs in a heterogeneous network according to an embodiment of the present disclosure. The method includes the following steps.

Figure 1:
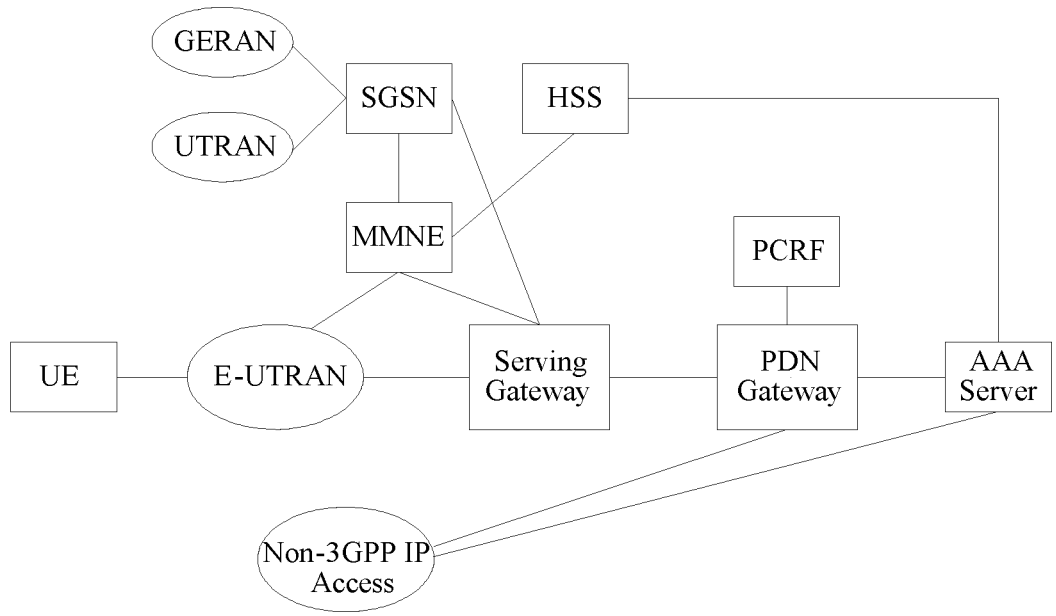
FIG. 1 is a schematic structural view of an evolution network system for a 3GPP network in the prior art.
Figure 2:
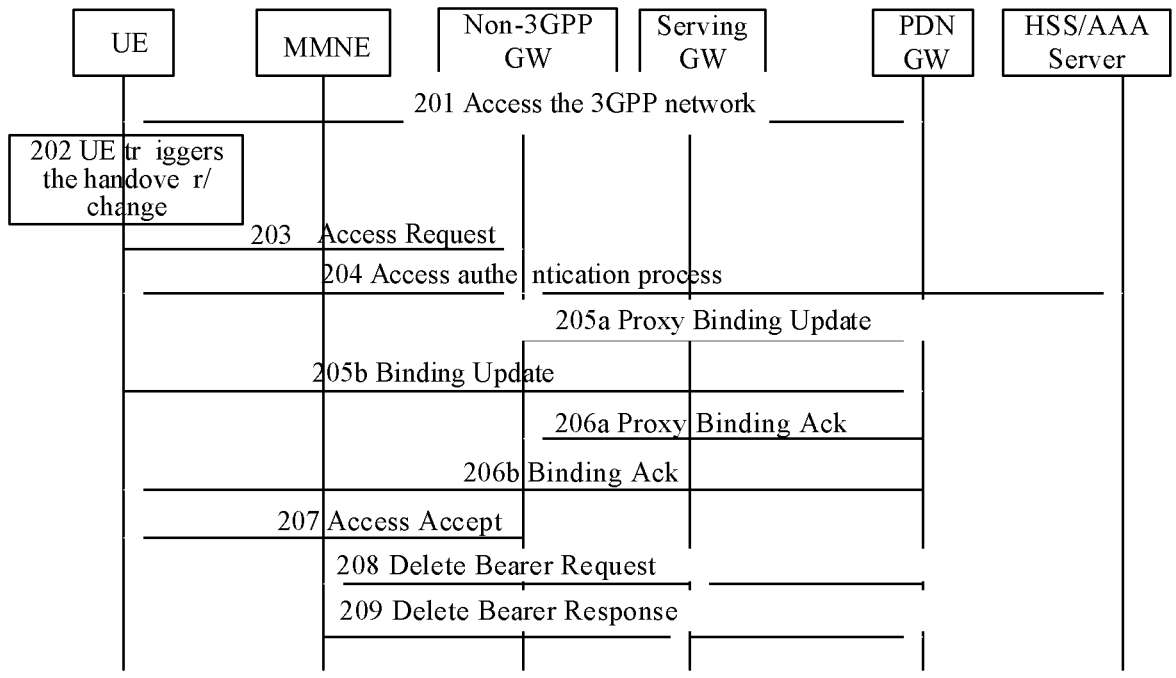
FIG. 2 is a flow chart of a process that the UE is handed over or switched from a 3GPP network to a non-3GPP network in the prior art.

Steps 601-607 are the same as steps 201-207 in FIG. 2.

In step 608a, the PDN GW sends a delete bearer request message to the serving GW, and then the serving GW sends the received delete bearer request message to the MME, and adds a cause IE in the delete bearer request message to indicate the reason of the deletion, and the MME deletes the bearer resources.

In this step, as for the bearer deletion caused by the handover or switching of the UE from the 3GPP network to the non-3GPP network, the PDN GW sets the cause IE as "UE's accessing RAT changed from a 3GPP network to a non-3GPP network". As for the bearer deletion that is not caused by the handover or change, the PDN GW sets the cause IE to other values. Alternatively, the delete bearer request message sent by the PDN GW does not carry the cause IE, and in this case, once the MME receives the delete bearer request message sent by the serving GW, the message is defaulted to be caused by the handover or switching of the UE from the 3GPP network to the non-3GPP network. In this embodiment, the message carrying the cause IE is taken as an example.

In this step, it is assumed that an interface protocol between the PDN GW and the serving GW is GPRS tunneling protocol (GTP). If the interface protocol between the PDN GW and the serving GW is the PMIP, step 608a is replaced by step 608b, in which the PDN GW sends a binding revocation indication message to the serving GW; the cause IE is added to the binding revocation indication message; the serving GW sends the delete bearer request message carrying the cause IE sent by the PDN GW to the MME; and the MME deletes the bearer resources after receiving the delete bearer request message.

As for the binding revocation indication caused by the handover or switching of the UE from the 3GPP network to the non-3GPP network, the PDN GW sets the cause IE as "UE's accessing RAT changed from a 3GPP network to a non-3GPP network". As for the bearer deletion that is not caused by the handover or change, the PDN GW sets the cause IE to other values. Alternatively, the binding revocation indication message sent by the PDN GW does not carry the cause IE, and in this case, once the MME receives the delete bearer request message sent by the serving GW, the message is default to be caused by the handover or switching of the UE from the 3GPP network to the non-3GPP network. In this embodiment, the message carrying the cause IE is taken as an example.

Step 608a or step 608b further includes the following: the MME deletes the bearer resources after receiving the delete bearer request message. If the MME finds that all bearer resources of the UE are deleted, the MME further determines whether to delete an MM context (i.e., detaching the UE from the 3GPP network) and whether to send a detach request message to the UE. Specifically, the process includes the following circumstances.

1) The MME makes the following determination according to the cause IE carried in the delete bearer request. The MME determines whether the cause IE carried in the received delete bearer request message is represented as "UE's accessing RAT changed from a 3GPP network to a non-3GPP network"; if yes, the MME deletes the MM context of the UE, and does not send the detach request message to the UE; otherwise, the MME sends the detach request message to the UE and notifies the UE to delete the MM context and the bearer resources of the 3GPP network in the UE.

2) The MME makes the following determination according to the IE carried in the delete bearer request and the terminal capability of the UE. If the MME determines that the IE carried in the received delete bearer request message is represented as "UE's accessing RAT changed from a 3GPP network to a non-3GPP network", and the MME knows that the terminal capability of the UE is "single radio capability", the MME deletes the MM context of the UE, and does not send the detach request message to the UE; as for the bearer deletion caused by other reasons, the MME deletes the MM context of the UE, and sends the detach request message to the UE. If the MME knows that the terminal capability of the UE is "multi radio capability", the MME does not delete the MM context of the UE (that is, does not detach the UE from the 3GPP network).

3) The MME makes the following determination according to the IE carried in the delete bearer request and the access policy information of the operator. If the MME determines that the IE carried in the received delete bearer request message is represented as "UE's accessing RAT changed from a 3GPP network to a non-3GPP network", and the MME knows that the access policy information of the operator is "single radio access", the MME deletes the MM context of the UE, and does not send the detach request message to the UE; as for the bearer deletion caused by other reasons, the MME deletes the MM context of the UE, and sends the detach request message to the UE. If the MME knows that the access policy information of the operator is "multi radio access", the MME does not delete the MM context of the UE (that is, does not detach the UE from the 3GPP network).

4) The MME makes the following determination according to the IE carried in the delete bearer request, the terminal capability of the UE, and the access policy information of the operator. If the MME determines that the IE carried in the received delete bearer request message is represented as "UE's accessing RAT changed from a 3GPP network to a non-3GPP network", the terminal capability of the UE is "dual radio capability", and the access policy information of the operator is "single radio access", or if the MME determines that the IE carried in the received delete bearer request message is represented as "UE's accessing RAT changed from a 3GPP network to a non-3GPP network", the access policy information of the operator is "multi radio access", and the terminal capability of the UE is "single radio capability", or if the MME determines that the IE carried in the received delete bearer request message is represented as "UE's accessing RAT changed from a 3GPP network to a non-3GPP network", the terminal capability of the UE is "single radio capability", and the access policy information of the operator is "single radio access", the MME deletes the MM context of the UE, and does not send the detach request message to the UE; as for the bearer deletion caused by other reasons, the MME deletes the MM context of the UE, and sends the detach request message to the UE. If the MME knows that the terminal capability of the UE is "dual radio capability" and the access policy information of the operator is "multi radio access", the MME does not delete the MM context of the UE (that is, does not detach the UE from the 3GPP network).

In step 609a, the MME returns a delete bearer response message to the serving GW, and the serving GW returns the delete bearer response message to the PDN GW.

In this step, the interface protocol between the PDN GW and the serving GW is the GIP, and if the interface protocol between the PDN GW and the serving GW is the PMIP, Step 609a is replaced by step 609b, in which the MME returns the delete bearer response message to the serving GW, and the serving GW returns a binding revocation Ack message to the PDN GW.

In step 610, if the MME sends the detach request message to the UE, the UE deletes the MM context and the bearer resources after receiving the detach request message, and returns a Detach Accept message to the MME.

In step 611, if the MME finds that the subscription data and the MM context of the UE are deleted, the MME sends a purge UE message to the HSS/AAA server, and the HSS/AAA server purges the record of the UE, and returns a purge UE Ack message to the MME.

In this step, it is determined whether to delete the subscription data of the UE by the MME according to the actual conditions. This step is optional.

In the above embodiment, after step 607, it is determined whether to detach the UE from the 3GPP network. Specifically, the determination process is described as follows: according to the handover or change in the access network, or according to the handover or change of the UE in the access network and the terminal capability of the UE, or according to the handover or change of the UE in the access network and the access policy information of the operator, or according to the handover or change of the UE in the access network, the terminal capability of the UE, and the access policy information of the operator, it is determined whether to detach the UE from the 3GPP network, which particularly includes the following four circumstances.

1) It is determined whether the UE is handed over or switched from the 3GPP network to the non-3GPP network; if yes, the MM context and bearer resources used by the UE in the 3GPP network are deleted.

2) It is determined whether the UE is handed over or switched from the 3GPP network to the non-3GPP network and whether the terminal capability of the UE is "single radio capability"; if yes, the bearer resources and the MM context used by the UE in the 3GPP network are deleted.

3) It is determined whether the UE is handed over or switched from the 3GPP network to the non-3GPP network and whether the access policy information of the operator is "single radio access"; if yes, the bearer resources and the MM context used by the UE in the 3GPP network are deleted.

4) It is determined whether the handover or change of the UE in the access network, the terminal capability of the UE, and the access policy information of the operator satisfy one of the following three conditions: 1. the UE is handed over or switched from the 3GPP network to the non-3GPP network, the terminal capability of the UE is "dual radio capability", and the access policy information of the operator is "single radio access"; 2. the UE is handed over or switched from the 3GPP network to the non-3GPP network, the access policy information of the operator is "multi radio access", and the terminal capability of the UE is "single radio capability"; and 3. the UE is handed over or switched from the 3GPP network to the non-3GPP network, the terminal capability of the UE is "single radio capability", and the access policy information of the operator is "single radio access".

If yes, the bearer resources and the MM context used by the UE in the 3GPP network are deleted.

Moreover, the delete bearer request added with the cause IE in step 608 may be replaced by another message, for example, replaced by a release bearer request message. The release bearer request message indicates that the reason for deleting the bearer is the handover or switching of the UE from the 3GPP network to the non-3GPP network; alternatively, the delete bearer request message sent in step 608 does not carry the reason for deleting the bearer, and when the UE is handed over or switched from the 3GPP network to the non-3GPP network, a normal delete bearer request is sent to the MME. In step 608, after receiving the specific message or the normal delete bearer request message, the MME deletes the bearer resources; and the operations of the MME after the bearer resources are deleted are similar to the operations of the MME after receiving the delete bearer request message.

As for the first embodiment, it should be noted that the detachment method in this embodiment is also applicable to the handover or switching of the UE from a non-3GPP network to a 3GPP network.

In step I, after the UE is handed over or switched to a 3GPP network, the PDN GW sends the binding revocation indication message to a non-3GPP GW. The message carries the cause IE indicating the reason for the binding revocation. As for the binding revocation caused by the handover or switching from the non-3GPP network to the 3GPP network, the PDN GW sets the cause IE as "UE's accessing RAT changed from a non-3GPP network to a 3GPP network"; and as for the binding revocation that is not caused by the handover or change, the PDN GW sets the cause IE to other values.

In step II, the non-3GPP GW deletes the bearer resources after receiving the binding revocation indication message. If the non-3GPP GW finds that all bearer resources of the UE are deleted, the non-3GPP GW further determines whether to delete the MM context of the UE (that is, to detach the UE from the non-3GPP network), which specifically includes the following circumstances.

1) The non-3GPP GW makes the following determination according to the Cause IE carried in the binding revocation indication message, in which the non-3GPP GW determines whether the cause IE carried in the binding revocation indication message is represented as "UE's accessing RAT changed from a non-3GPP network to a 3GPP network"; if yes, the non-3GPP GW deletes the MM context of the UE, and does not send the detach request message to the UE; otherwise, the non-3GPP GW sends the detach request message to the UE, and notifies the UE to delete the MM context and bearer resources of the non-3GPP network in the UE.

2) The non-3GPP GW makes the following determination according to the IE carried in the binding revocation indication message and the terminal capability of the UE, in which if the non-3GPP GW determines that the IE carried in the received binding revocation indication message is represented as "UE's accessing RAT changed from a non-3GPP network to a 3GPP network", and the non-3GPP GW knows that the terminal capability of the UE is "single radio capability", the non-3GPP GW deletes the MM context of the UE, and does not send the detach request message to the UE; as for the bearer deletion caused by other reasons, the non-3GPP GW deletes the MM context of the UE, and sends the detach request message to the UE. If the non-3GPP GW knows that the terminal capability of the UE is "multi radio capability", the non-3GPP GW does not delete the MM context of the UE (that is, does not detach the UE from the non-3GPP network).

3) The non-3GPP GW makes the following determination according to the IE carried in the binding revocation indication message and the access policy information of the operator, in which if the non-3GPP GW determines that the IE carried in the received binding revocation indication message is represented as "UE's accessing RAT changed from a non-3GPP network to a 3GPP network", and the non-3GPP GW knows that the access policy information of the operator is "single radio access", the non-3GPP GW deletes the MM context of the UE, and does not send the detach request message to the UE; as for the bearer deletion caused by other reasons, the non-3GPP GW deletes the MM context of the UE, and sends the detach request message to the UE. If the non-3GPP GW knows that the access policy information of the operator is "multi radio access", the non-3GPP GW does not delete the MM context of the UE (that is, does not detach the UE from the non-3GPP network).

4) The non-3GPP GW makes the following determination according to the IE carried in the binding revocation indication message, the terminal capability of the UE, and the access policy information of the operator, in which if the non-3GPP GW determines that the IE carried in the received binding revocation indication message is represented as "UE's accessing RAT changed from a non-3GPP network to a 3GPP network", the terminal capability of the UE is "dual radio capability", and the access policy information of the operator is "single radio access", or if the non-3GPP GW determines that the IE carried in the received binding revocation indication message is represented as "UE's accessing RAT changed from a non-3GPP network to a 3GPP network", the access policy information of the operator is "multi radio access", and the terminal capability of the UE is "single radio capability", or if the non-3GPP GW determines that the IE carried in the received binding revocation indication message is represented as "UE's accessing RAT changed from a non-3GPP network to a 3GPP network", the terminal capability of the UE is "single radio capability", and the access policy information of the operator is "single radio access", the non-3GPP GW deletes the MM context of the UE, and does not send the detach request message to the UE; as for the bearer deletion caused by other reasons, the non-3GPP GW deletes the MM context of the UE, and sends the detach request message to the UE. If the non-3GPP GW knows that the terminal capability of the UE is "dual radio capability", and the access policy information of the operator is "multi radio access", the non-3GPP GW does not delete the MM context of the UE (that is, does not detach the UE from the non-3GPP network).

Figure 7:
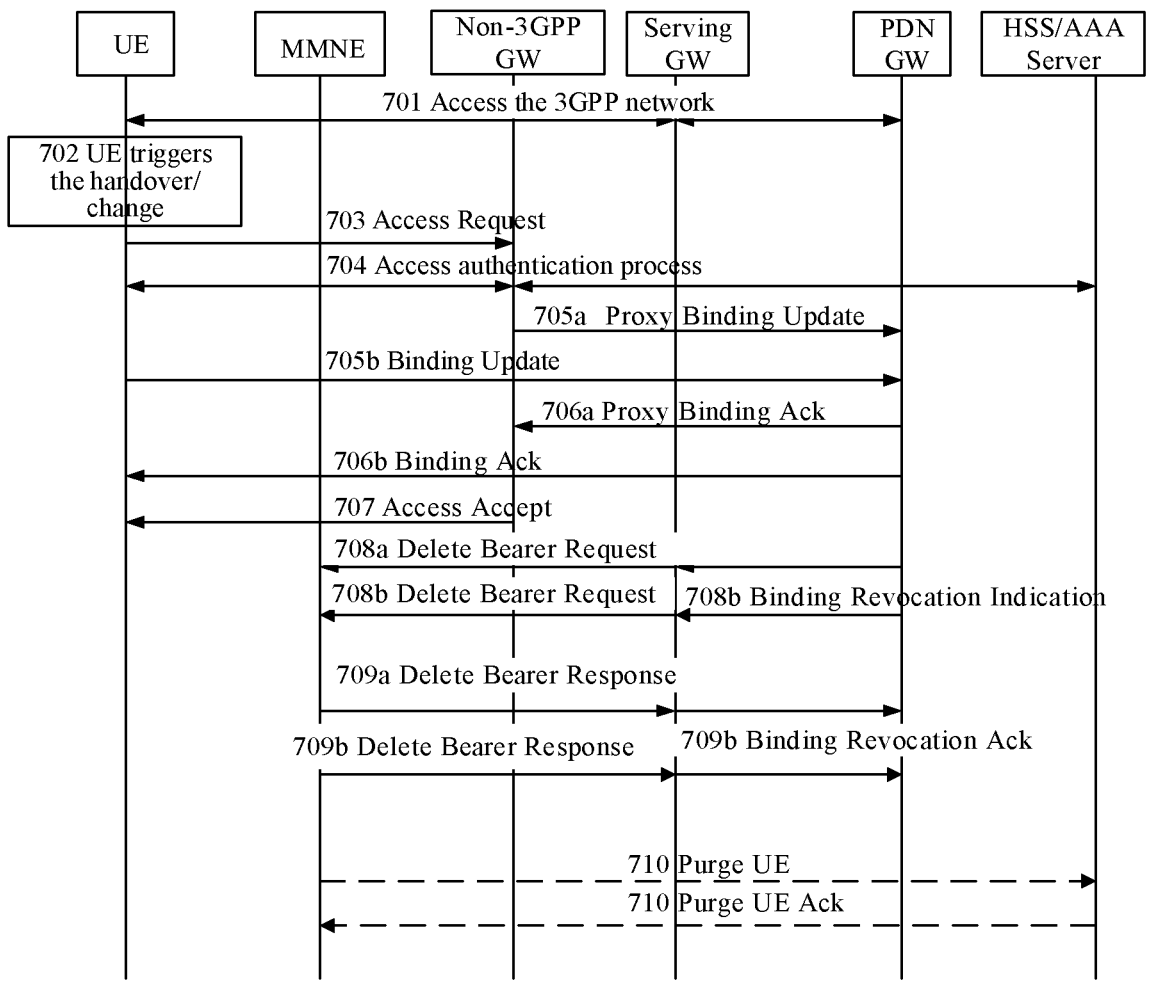
FIG. 7 shows a second example of the method for user detachment when a handover or change occurs in a heterogeneous network according to an embodiment of the present disclosure.

FIG. 7 shows a second example of the method for user detachment when a handover or change occurs in a heterogeneous network according to an embodiment of the present disclosure. The method includes the following steps.

Steps 701-707 are the same as steps 201-207 in FIG. 2.

In step 708a, the PDN GW determines whether to delete the default bearer of the UE; if yes, the PDN GW sends the delete bearer request message corresponding to the default bearer to the serving GW, and the serving GW sends the received delete bearer request message to the MME.

The default bearer is a part of the bearer resources.

In this step, the interface protocol between the PDN GW and the serving GW is the GTP. If the interface protocol between the PDN GW and the serving GW is the PMIP, step 708a is replaced by step 708b, in which the PDN GW sends the binding revocation indication message to the serving GW, and the serving GW determines whether to delete the default bearer of the UE; if yes, the serving GW sends the delete bearer request message corresponding to the default bearer to the MME, and the MME deletes the MM context and the bearer resources.

In step 708a or 708b, the PDN GW/serving GW determines whether to delete the default bearer of the UE in the following manners. The PDN GW/serving GW determines whether to delete the default bearer of the UE according to the handover or change of the UE in the access network, or according to the handover or change of the UE in the access network and the terminal capability of the UE, or according to the handover or change of the UE in the access network and the access policy information of the operator, or according to the handover or change of the UE in the access network, the terminal capability of the UE, and the access policy information of the operator. The terminal capability of the UE and the access policy information of the operator are obtained by the network elements according to the flows shown in FIGS. 3 and 4. Specifically, the determination process includes the following circumstances.

1) The PDN GW/serving GW determines whether to delete the default bearer of the UE according to the handover or change of the UE in the access network, in which the PDN GW/serving GW determines whether the UE is handed over or switched from the 3GPP network to the non-3GPP network; if yes, the PDN GW/serving GW determines to delete the default bearer of the UE, and sends the delete bearer request message corresponding to the default bearer to the MME.

2) The PDN GW/serving GW determines whether to delete the default bearer of the UE according to the handover or change of the UE in the access network and the terminal capability of the UE, in which the PDN GW/serving GW determines whether the UE is handed over or switched from the 3GPP network to the non-3GPP network and whether the terminal capability of the UE is "single radio capability"; if yes, the PDN GW/serving GW determines to delete the default bearer of the UE, and sends the delete bearer request message corresponding to the default bearer to the MME.

3) The PDN GW/serving GW determines whether to delete the default bearer of the UE according to the handover or change of the UE in the access network and the access policy information of the operator, in which the PDN GW/serving GW determines whether the UE is handed over or switched from the 3GPP network to the non-3GPP network and whether the access policy information of the operator is "single radio access"; if yes, the PDN GW/serving GW determines to delete the default bearer of the UE, and sends the delete bearer request message corresponding to the default bearer to the MME.

4) The PDN GW/serving GW determines whether to delete the default bearer of the UE according to the handover or change of the UE in the access network, the terminal capability of the UE, and the access policy information of the operator, in which the PDN GW/serving GW determines whether the handover or change of the UE in the access network, the terminal capability of the UE, and the access policy information of the operator satisfy one of the following three conditions: 1. the UE is handed over or switched from the 3GPP network to the non-3GPP network, the terminal capability of the UE is "dual radio capability", and the access policy information of the operator is "single radio access"; 2. the UE is handed over or switched from the 3GPP network to the non-3GPP network, the access policy information of the operator is "multi radio access", and the terminal capability of the UE is "single radio capability"; and 3. the UE is handed over or switched from the 3GPP network to the non-3GPP network, the terminal capability of the UE is "single radio capability", and the access policy information of the operator is "single radio access".

If yes, the PDN GW/serving GW determines to delete the default bearer of the UE, and sends the delete bearer request message corresponding to the default bearer to the MME.

In step 709a, the MME returns a delete bearer response message to the serving GW, and the serving GW returns the delete bearer response message to the PDN GW.

In this step, the interface protocol between the PDN GW and the serving GW is the GTP. If the interface protocol between the PDN GW and the serving GW is the PMIP, step 709a is replaced by step 709b, in which the MME returns the delete bearer response message to the serving GW, and the serving GW returns the binding revocation Ack message to the PDN GW.

In step 710, if the MME finds that the default bearer of the UE is deleted, the MME deletes the MM context of the UE (that is, the MME detaches the UE from the 3GPP network).

If the MME finds that the subscription data and the MM context of the UE are deleted, the MME sends a purge UE message to the HSS/AAA server, and the HSS/AAA server purges the record of the UE, and returns a purge UE Ack message to the MME.

In this step, it is determined whether to delete the subscription data of the UE by the MME according to the actual conditions. This step is optional.

Step 709 and step 710 may be performed at any order.

In the above embodiment, the UE is detached after step 707. The detachment process is as follows: according to the handover or change of the UE in the access network, or according to the handover or change of the UE in the access network and the terminal capability of the UE, or according to the handover or change of the UE in the access network and the access policy information of the operator, or according to the handover or change of the UE in the access network, the terminal capability of the UE, and the access policy information of the operator, the UE determines whether to perform the detachment, which specifically includes the following four circumstances.

1) It is determined whether the UE is handed over or switched from the 3GPP network to the non-3GPP network; if yes, the UE also deletes the default bearer, and deletes the MM context and bearer resources used by the UE in the 3GPP network (that is, the UE is detached from the 3GPP network); otherwise, the UE does not delete the default bearer, and does not delete the MM context used by the UE in the 3GPP network.

2) It is determined whether the UE is handed over or switched from the 3GPP network to the non-3GPP network and whether the terminal capability of the UE is "single radio capability"; if yes, the UE also deletes the default bearer, and deletes the MM context and bearer resources used by the UE in the 3GPP network (that is, the UE is detached from the 3GPP network); otherwise, the UE does not delete the default bearer, and does not delete the MM context used by the UE in the 3GPP network.

3) It is determined whether the UE is handed over or switched from the 3GPP network to the non-3GPP network and whether the access policy information of the operator is "single radio access"; if yes, the UE also deletes the default bearer, and deletes the MM context and bearer resources used by the UE in the 3GPP network (that is, the UE is detached from the 3GPP network); otherwise, the UE does not delete the default bearer, and does not delete the MM context used by the UE in the 3GPP network.

4) It is determined whether the handover or change of the UE in the access network, the terminal capability of the UE, and the access policy information of the operator satisfy one of the following three conditions: 1. the UE is handed over or switched from the 3GPP network to the non-3GPP network, the terminal capability of the UE is "dual radio capability", and the access policy information of the operator is "single radio access"; 2. the UE is handed over or switched from the 3GPP network to the non-3GPP network, the access policy information of the operator is "multi radio access", and the terminal capability of the UE is "single radio capability"; and 3. the UE is handed over or switched from the 3GPP network to the non-3GPP network, the terminal capability of the UE is "single radio capability", and the access policy information of the operator is "single radio access".

If yes, the UE deletes the default bearer, and deletes the MM context and bearer resources used by the UE in the 3GPP network (that is, the UE is detached from the 3GPP network); otherwise, the UE does not delete the default bearer, and does not delete the MM context used by the UE in the 3GPP network.

Figure 8:
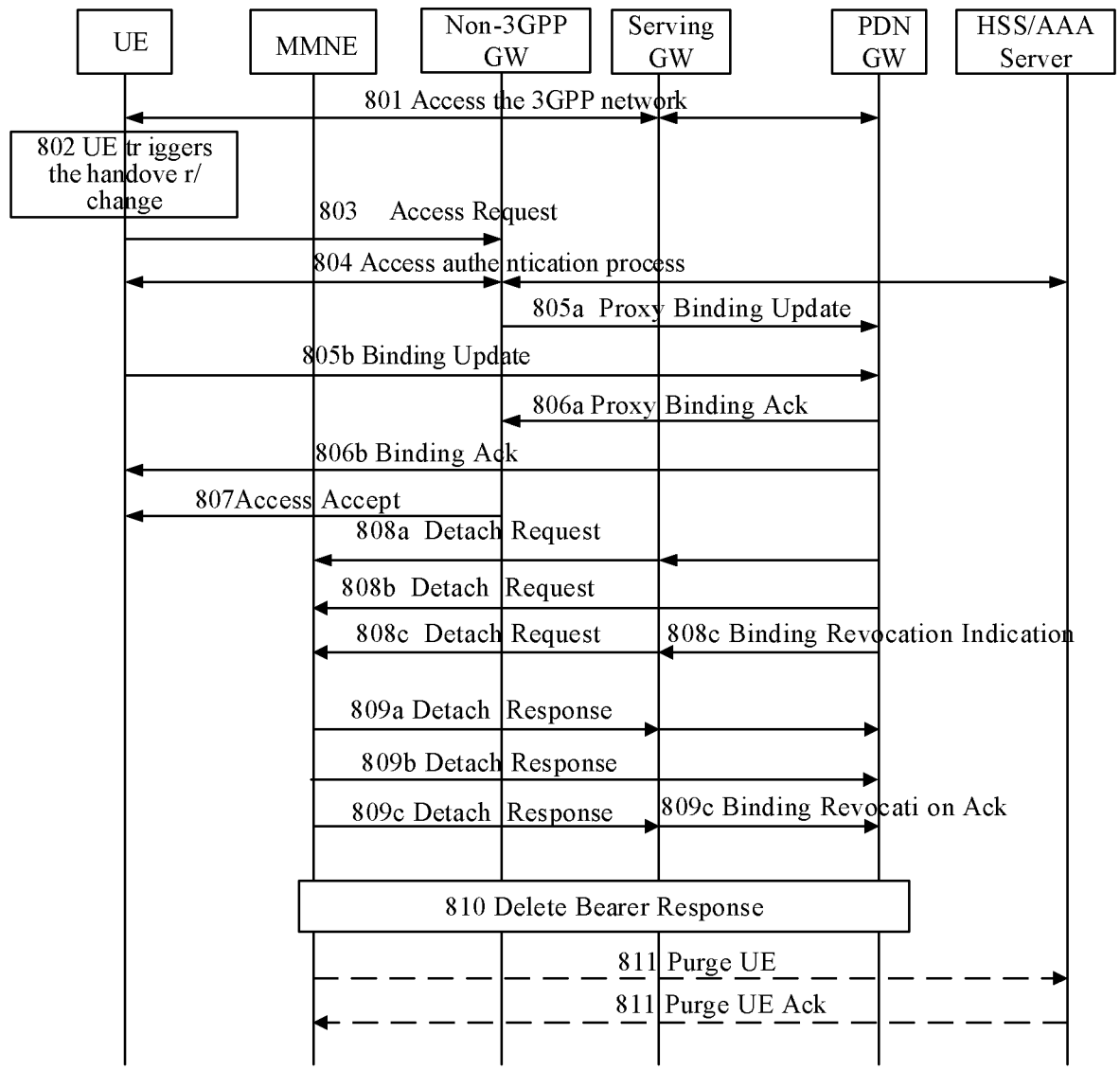
FIG. 8 shows a third example of the method for user detachment when a handover or change occurs in a heterogeneous network according to an embodiment of the present disclosure.

FIG. 8 shows a third example of the method for user detachment when a handover or change occurs in a heterogeneous network according to an embodiment of the present disclosure. The method includes the following steps.

Steps 801-807 are the same as steps 201-207 in FIG. 2.

In step 808a, the PDN GW sends a detach request message to the MME through the serving GW, and the detach request message carries a cause value represented as "detach because of UE's accessing RAT changed from a 3GPP network to a non-3GPP network", which indicates that the detach request message is caused by the handover or switching of the UE from the 3GPP network to the non-3GPP network.

In this step, no interface exists between the PDN GW and the MME. If an interface exists between the PDN GW and the MME, step 808a is replaced by step 808b, in which the PDN GW sends a Detach Request message to the MME, and the Detach Request message carries a Cause value represented as "Detach because of UE's accessing RAT changed from a 3GPP network to a non-3GPP network", indicating that the detach request message is caused by the handover or change of the UE from the 3GPP network to the non-3GPP network.

If the interface protocol between the PDN GW and the MME is the PMIP, step 808a is replaced by step 808c, in which the PDN GW sends a binding revocation Ind message to the serving GW, and the serving GW sends the detach request message to the MME, and the detach request message carries a cause value represented as "detach because of UE's accessing RAT changed from a 3GPP network to a non-3GPP network", indicating that the detach request message is caused by the handover or change of the UE from the 3GPP network to the non-3GPP network.

In step 808*a*, 808*b*, or 808*c*, before the detach request message is sent, the process further includes determining whether to send the detach request message according to the handover or change of the UE in the access network, or according to the handover or change of the UE in the access network and the terminal capability of the UE, or according to the handover or change of the UE in the access network and the access policy information of the operator, or according to the handover or change of the UE in the access network, the terminal capability of the UE, and the access policy information of the operator; if yes, the detach request message is sent to the MME; otherwise, the process ends. In steps 808*a* and 808*b*, the determination is performed by the PDN GW, and in step 808*c*, the determination is performed by the serving GW. Whether to send the detach request message may be determined according to the following circumstances.

1) The PDN GW/serving GW determines whether to send the detach request message to the MME according to the handover or change of the UE in the access network, in which the PDN GW/serving GW determines whether the UE is handed over from the 3GPP network to the non-3GPP network; if yes, the detach request message is sent to the MME; otherwise, the process ends.

2) The PDN GW/serving GW determines whether to send the detach request message to the MME according to the handover or change of the UE in the access network and the terminal capability of the UE, in which the PDN GW/serving GW determines whether the UE is handed over or switched from the 3GPP network to the non-3GPP network and whether the terminal capability of the UE is "single radio capability"; if yes, the detach request message is sent to the MME; otherwise, the process ends.

3) The PDN GW/serving GW determines whether to send the detach request message to the MME according to the handover or change of the UE in the access network and the access policy information of the operator, in which the PDN GW/serving GW determines whether the UE is handed over or switched from the 3GPP network to the non-3GPP network and whether the access policy information of the operator is "single radio access"; if yes, the detach request message is sent to the MME; otherwise, the process ends.

4) The PDN GW/serving GW determines whether to send the detach request message to the MME according to the handover or change of the UE in the access network, the terminal capability of the UE, and the access policy information of the operator, in which the PDN GW/serving GW determines whether the handover or change of the UE in the access network, the terminal capability of the UE, and the access policy information of the operator satisfy one of the following three conditions: 1. the UE is handed over or switched from the 3GPP network to the non-3GPP network, the terminal capability of the UE is "dual radio capability", and the access policy information of the operator is "single radio access"; 2. the UE is handed over or switched from the 3GPP network to the non-3GPP network, the access policy information of the operator is "multi radio access", and the terminal capability of the UE is "single radio capability"; and 3. the UE is handed over or switched from the 3GPP network to the non-3GPP network, the terminal capability of the UE is "single radio capability", and the access policy information of the operator is "single radio access".

If yes, the detach request message is sent to the MME; otherwise, the process ends.

In step 809*a*, the MME receives the detach request message, deletes the MM context, and sends a detach response message to the PDN GW through the serving GW.

In this step, no interface exists between the PDN GW and the MME. If an interface exists between the PDN GW and the MME, step 809*a* is replaced by step 809*b*, in which the MME receives the detach request message, deletes the MM context, and directly sends a detach response message to the PDN GW.

If the interface protocol between the PDN GW and the MME is the PMIP, step 809*a* is replaced by step 809*c*, in which the PDN GW sends the detach response message to the serving GW, and the serving GW returns a binding revocation Ack message to the PDN GW.

In step 810, the MME initiates a bearer deletion process to delete the bearer resources used by the UE on the 3GPP network side (including the MME, serving GW, and PDN GW).

In step 811, if the MME finds that the subscription data and the MM context of the UE are deleted, the MME sends a purge UE message to the HSS/AAA server, and then the HSS/AAA server purges the record of the UE, and returns a purge UE Ack message to the MME.

In this step, it is determined whether to delete the subscription data of the UE by the MME according to the actual conditions. This step is optional.

Step 809 and Step 811 may be performed at any order.

In this embodiment, the UE is detached after step 807, and the detailed process thereof can be known with reference to the descriptions of the third example of the method for user detachment.

In this embodiment, it should be noted that, the detach request message sent by the PDN GW or serving GW may not carry the cause value.

In this embodiment, it should be noted that, the method in this embodiment is also applicable to the handover or switching of the UE from the non-3GPP network to the 3GPP network.

After the UE is handed over or switched from the non-3GPP network to the 3GPP network, the PDN GW determines whether to detach the UE from the non-3GPP network and whether to send the detach request message to the non-3GPP GW, which includes determining whether to send the detach request message according to the handover or change of the UE in the access network, or according to the handover or change of the UE in the access network and the terminal capability of the UE, or according to the handover or change of the UE in the access network and the access policy information of the operator, or according to the handover or change of the UE in the access network, the terminal capability of the UE, and the access policy information of the operator; if yes, the detach request message is sent to the non-3GPP GW. The detailed process thereof can be known with reference to the descriptions of the above embodiment.

Figure 9:
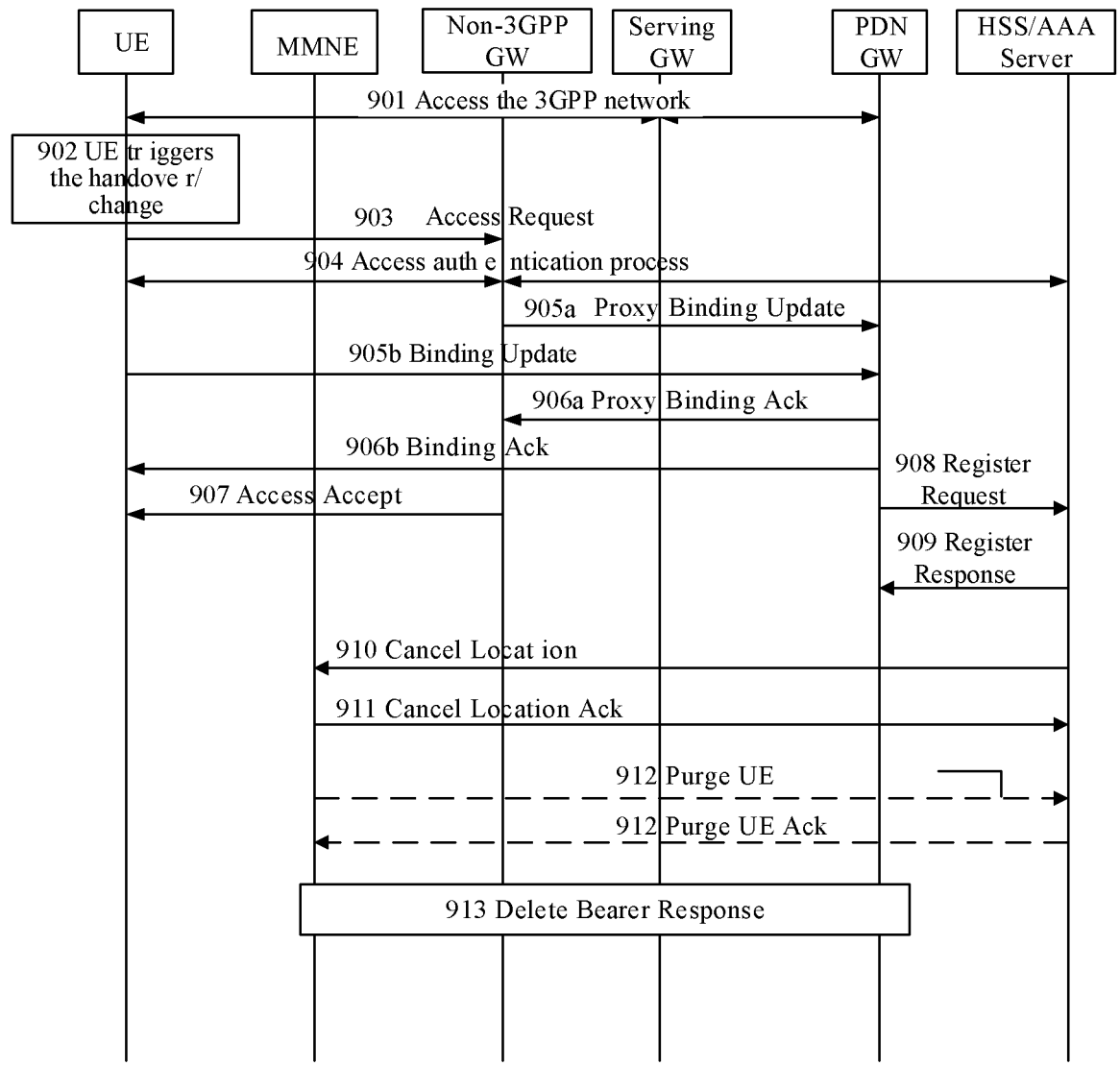
FIG. 9 shows a fourth example of the method for user detachment when a handover or change occurs in a heterogeneous network according to an embodiment of the present disclosure.

FIG. 9 shows a fourth example of the method for user detachment when a handover or change occurs in a heterogeneous network according to an embodiment of the present disclosure. The method includes the following steps.

Steps 901-907 are the same as steps 201-207 in FIG. 2.

In step 908, the PDN GW sends a register request message to the HSS/AAA server, and the message carries an RAT type of the UE.

The value of the RAT Type may be one of the following two circumstances.

The RAT Type may be a 3GPP network, which indicates that the network that the UE accesses currently is a 3GPP network; and the RAT Type may be a non-3GPP network, which indicates that the network that the UE accesses currently is a non-3GPP network.

The RAT Type of the UE may also be a specific network type, for example, GERAN, UTRAN, or EUTRAN network in the 3GPP networks, or WLAN, Wimax, and CDMA network in the non-3GPP networks.

Step 906 and step 908 may be performed at any order.

In step 909, the HSS/AAA server returns a register response message to the PDN GW.

In step 910, when the HSS/AAA server determines that the RAT Type of the UE registered last time is inconsistent with that of the UE registered this time, the HSS/AAA server sends a cancel location message to the MME, in which the cancel location message carries a cause value represented as "Cancel because of UE's accessing RAT changed from a 3GPP network to a non-3GPP network", indicating that the cancel location is caused by the handover or switching of the UE from the 3GPP network to the non-3GPP network.

In this step, before the cancel location message is sent to the MME, the process further includes that the HSS/AAA server determines whether to send the cancel location message according to the handover or change of the UE in the access network, or according to the handover or change of the UE in the access network and the terminal capability of the UE, or according to the handover or change of the UE in the access network and the access policy information of the operator, or according to the handover or change of the UE in the access network, the terminal capability of the UE, and the access policy information of the operator; if yes, the HSS/AAA server sends the cancel location message to the MME; otherwise, the HSS/AAA server does not send the cancel location message to the MME, and the process ends. Specifically, the determination process specifically includes the following circumstances.

1) The HSS/AAA server determines whether to send the cancel location message to the MME according to the handover or change of the UE in the access network, in which the HSS/AAA server determines whether the UE is handed over or switched from the 3GPP network to the non-3GPP network; if yes, the HSS/AAA server sends the cancel location message to the MME; otherwise, the HSS/AAA server does not send the cancel location message to the MME, and the process ends.

2) The HSS/AAA server determines whether to send the cancel location message to the MME according to the handover or switching of the UE in the access network and the terminal capability of the UE, in which if the HSS/AAA server determines that the UE is handed over or switched from the 3GPP network to the non-3GPP network, and the terminal capability of the UE is "single radio capability", the HSS/AAA server sends the cancel location message to the MME; if the HSS/AAA server determines that the terminal capability of the UE is "multi radio capability", the HSS/AAA server does not send the cancel location message to the MME.

3) The HSS/AAA server determines whether to send the cancel location message to the MME according to the handover or change of the UE in the access network and the access policy information of the operator, in which if the HSS/AAA server determines that the UE is handed over or switched from the 3GPP network to the non-3GPP network, and the access policy information of the operator is "single radio access", the HSS/AAA server sends the cancel location message to the MME; if the HSS/AAA server determines that the UE is handed over or switched from the 3GPP network to the non-3GPP network, and the access policy information of the operator is "multi radio access", the HSS/AAA server does not send the cancel location message to the MME.

4) The HSS/AAA server determines whether to send the cancel location message to the MME according to the handover or switching of the UE in the access network, the terminal capability of the UE, and the access policy information of the operator, in which if the HSS/AAA server determines that the UE is handed over or switched from the 3GPP network to the non-3GPP network, the terminal capability of the UE is "dual radio capability", and the access policy information of the operator is "single radio access", or if the HSS/AAA server determines that the UE is handed over or switched from the 3GPP network to the non-3GPP network, the access policy information of the operator is "multi radio access", and the terminal capability of the UE is "single radio capability", or if the HSS/AAA server determines that the UE is handed over or switched from the 3GPP network to the non-3GPP network, the terminal capability of the UE is "single radio capability", and the access policy information of the operator is "single radio access", the HSS/AAA server sends the cancel location message to the MME; if the HSS/AAA server determines that the terminal capability of the UE is "dual radio capability" and the access policy information of the operator is "multi radio access", the HSS/AAA server does not send the cancel location message to the MME.

In step 911, after receiving the cancel location message, the MME deletes the MM context of the UE, and returns a cancel location Ack message to the HSS/AAA server.

In step 912, if the MME finds that the subscription data and the MM context of the UE are deleted, the MME sends a purge UE message to the HSS/AAA server, and then the HSS/AAA server purges the record of the UE, and returns a purge UE Ack message to the MME.

In this step, it is determined whether to delete the subscription data of the UE by the MME according to the actual conditions. This step is optional.

In step 913, the MME initiates a bearer deletion process to delete the bearer resources used by the UE on the 3GPP network side (including the MME, serving GW, and PDN GW).

In this embodiment, the UE is detached after step 907, and the detailed process thereof can be known with reference to the descriptions of the third example of the method for user detachment.

In this embodiment, it should be noted that, the HSS and the AAA server may be configured in different entities or in a same entity. When the HSS and the AAA server are configured in different entities, the register request message sent by the PDN GW in step 908 is forwarded to the HSS through the AAA server, the register response message sent by the HSS in step 909 is forwarded to the PDN GW through the AAA server, the cancel location message sent to the MME in step 910 is sent to the MME by the HSS, and the purge UE message sent by the MME in step 912 is sent to the HSS. The cancel location message sent by the HSS/AAA server may not carry the cause value.

In this embodiment, it should be noted that, the method in this embodiment is also applicable to the handover or switching of the UE from a non-3GPP network to a 3GPP network.

In Step I, after the UE is handed over or switched from the non-3GPP network to the 3GPP network, the MME or the PDN GW registers a new RAT Type of the UE with the HSS/AAA server.

In Step II, if the HSS/AAA server determines that the RAT type of the UE registered last time is inconsistent with that of the UE registered this time, the HSS/AAA server determines whether to send the cancel location message to a non-3GPP GW (to notify the non-3GPP GW to detach the UE from the non-3GPP network) according to the handover or change of the UE in the access network, or according to the handover or change of the UE in the access network and the terminal capability of the UE, or according to the handover or change of the UE in the access network and the access policy information of the operator, or according to the handover or change of the UE in the access network, the terminal capability of the UE, and the access policy information of the operator. If yes, the HSS/AAA server sends the cancel location message to the non-3GPP GW. The detailed process thereof can be known with reference to the descriptions of the above embodiment.

Figure 10:
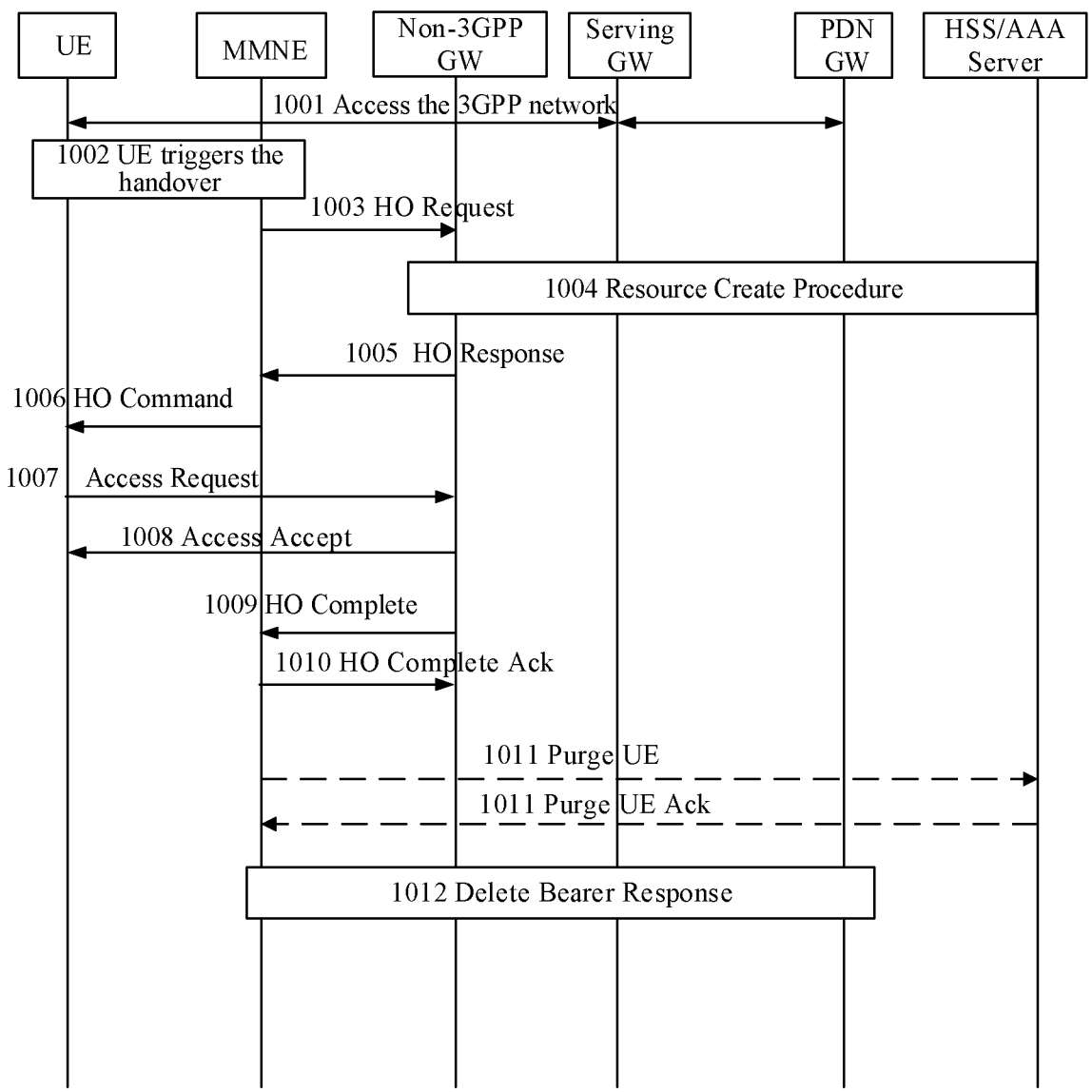
FIG. 10 shows a fifth example of the method for user detachment when a handover or change occurs in a heterogeneous network according to an embodiment of the present disclosure.

FIG. 10 shows a fifth example of the method for user detachment when a handover or change occurs in a heterogeneous network according to an embodiment of the present disclosure. The method includes the following steps.

In step 1001, the UE accesses a 3GPP access network through the serving GW and the PDN GW.

In step 1002, the UE triggers a handover or switching from the 3GPP network to the non-3GPP network.

In step 1003, the MME sends a handover or switching request (HO Request) message to a non-3GPP GW.

In this step, as for a WLAN system, the non-3GPP GW is an EPDG; as for a Wimax system, the non-3GPP GW is an ASN GW; and as for a CDMA system, the non-3GPP GW is an AGW.

In Step 1004, the non-3GPP GW performs a resource create procedure.

In this step, the resource create procedure includes performing the processes of user authentication and PMIP tunnel binding.

In step 1005, the non-3GPP GW returns an HO response message to the MME.

In step 1006, the MME sends an HO command message to the UE, and commands the UE to hand over or switch to an access network of the non-3GPP network.

In step 1007, the UE sends an access request message to the non-3GPP GW, and is handed over or switched to the non-3GPP network.

In step 1008, the non-3GPP GW returns an access accept message to the UE.

Steps 1001-1008 and the process of the handover or switching of the UE from a 3GPP network to a non-3GPP network in the prior art implement functions similar to that of steps 201-207 in FIG. 2.

In step 1009, the non-3GPP GW returns an HO complete message to the MME.

In step 1010, the MME returns an HO complete Ack message to the non-3GPP GW.

Step 1010 further includes: determining, by the MME, whether to delete the MM context of the UE (that is, to detach the UE from the 3GPP network) according to the handover or change of the UE in the access network, or according to the handover or change of the UE in the access network and the terminal capability of the UE, or according to the handover or change of the UE in the access network and the access policy information of the operator, or according to the handover or change of the UE in the access network, the terminal capability of the UE, and the access policy information of the operator; if yes, the MME deletes the MM context of the UE; otherwise, the process ends. Specifically, the determination process includes the following four circumstances.

1) The MME determines whether to delete the MM context of the UE according to the handover or change of the UE in the access network, in which if the MME determines that the UE is handed over or switched from the 3GPP network to the non-3GPP network, the MME deletes the MM context of the UE; otherwise, the MME does not delete the MM context of the UE.

2) The MME determines whether to delete the MM context of the UE according to the handover or change of the UE in the access network and the terminal capability of the UE, in which if the MME determines that the UE is handed over or switched from the 3GPP network to the non-3GPP network, and the terminal capability of the UE is "single radio capability", the MME deletes the MM context of the UE; if the MME determines that the terminal capability of the UE is "multi radio capability", the MME does not delete the MM context of the UE.

3) The MME determines whether to delete the MM context of the UE according to the handover or change of the UE in the access network and the access policy information of the operator, in which if the MME determines that the UE is handed over or switched from the 3GPP network to the non-3GPP network, and the access policy information of the operator is "single radio access", the MME deletes the MM context of the UE; if the MME determines that the access policy information of the operator is "multi radio access", the MME does not delete the MM context.

4) The MME determines whether to delete the MM context of the UE according to the handover or change of the UE in the access network, the terminal capability of the UE, and the access policy information of the operator, in which if the MME determines that the UE is handed over or switched from the 3GPP network to the non-3GPP network, the terminal capability of the UE is "dual radio capability", and the access policy information of the operator is "single radio access", or if the MME determines that the UE is handed over or switched from the 3GPP network to the non-3GPP network, the access policy information of the operator is "multi radio access", and the terminal capability of the UE is "single radio capability", or if the MME determines that the UE is handed over or switched from the 3GPP network to the non-3GPP network, the terminal capability of the UE is "single radio capability", and the access policy information of the operator is "single radio access", the MME deletes the MM context of the UE; if the MME determines that the terminal capability of the UE is "dual radio capability", and the access policy information of the operator is "multi radio access", the MME does not delete the MM context of the UE.

In step 1011, if the MME finds that the subscription data and the MM context of the UE are deleted, the MME sends a purge UE message to the HSS/AAA server, and then the HSS/AAA server purges the record of the UE, and returns a purge UE Ack message to the MME.

In this step, it is determined whether to delete the subscription data of the UE by the MME according to the actual conditions. This step is optional.

In step 1012, the MME initiates a bearer deletion process to delete the bearer resources used by the UE on the 3GPP network side (including the MME, serving GW, and PDN GW).

In this embodiment, the UE is detached after Step 1007, and the detailed process thereof can be known with reference to the descriptions of the third example of the method for user detachment.

In this embodiment, it should be noted that, the method in this embodiment is also applicable to the handover or switching of the UE from the non-3GPP network to the 3GPP network.

In Step I, after the UE is handed over or switched from the non-3GPP network to network, the MME returns an HO complete message to the non-3GPP GW.

In step II, the non-3GPP GW determines whether to delete the MM context of the UE (that is, to detach the UE from the non-3GPP network) according to the handover or change of the UE in the access network, or according to the handover or change of the UE in the access network and the terminal capability of the UE, or according to the handover or change of the UE in the access network and the access policy information of the operator, or according to the handover or change of the UE in the access network, the terminal capability of the UE, and the access policy information of the operator; if yes, the non-3GPP GW deletes the MM context of the UE. The detailed process thereof can be known with reference to the descriptions of the above embodiment.

FIG. 11 shows a sixth example of the method for user detachment when a handover or change occurs in a heterogeneous network according to an embodiment of the present disclosure. The method includes the following steps.

Steps 1101-1102 are the same as steps 201-202 in FIG. 2.

In step 1103, the UE sends a detach request message to the MME, and the detach request message carries a cause value represented as "detach because of UE's accessing RAT changed from a 3GPP network to a non-3GPP network", indicating that the detach request message is caused by the handover or change of the UE from the 3GPP network to the non-3GPP network.

In this step, before the UE sends the detach request message to MME, the process further includes determining whether to detach the UE from the 3GPP network according to the handover of the UE in the access network, or according to the handover of the UE in the access network and the terminal capability of the UE, or according to the handover of the UE in the access network and the access policy information of the operator, or according to the handover of the UE in the access network, the terminal capability of the UE, and the access policy information of the operator. If yes, the UE sends the detach request message to the MME; otherwise, step 1107 is performed. The terminal capability of the UE and the access policy information of the operator are obtained by the network elements according to the processes of FIGS. 3 and 4. Specifically, the determination process includes the following circumstances.

1) The UE determines whether to detach the UE from the 3GPP network and whether to send the detach request message to the MME according to the handover or change of the UE in the access network, in which the UE determines whether the UE is handed over or switched from the 3GPP network to the non-3GPP network; if yes, the MM context and bearer resources of the 3GPP network in the UE are deleted, and the detach request message is sent to the MME; otherwise, step 1107 is performed.

2) The UE determines whether to detach the UE from the 3GPP network and whether to send the detach request message to the MME according to the handover or change of the UE in the access network and the terminal capability of the UE, in which if the UE determines that the UE is handed over or switched from the 3GPP network to the non-3GPP network, and the terminal capability of the UE is "single radio capability", the MM context and the bearer resources of the 3GPP network in the UE are deleted, and the detach request message is sent to the MME; if the UE determines that the terminal capability of the UE is "multi radio capability", the MM context of the 3GPP network in the UE is not deleted (that is, the UE is not detached from the 3GPP network), the detach request message is not sent to the MME, and step 1107 is performed.

3) The UE determines whether to detach the UE from the 3GPP network and whether to send the detach request message to the MME according to the handover or change of the UE in the access network and the access policy information of the operator, in which if the UE determines that the UE is handed over or switched from the 3GPP network to the non-3GPP network, and the access policy information of the operator is "single radio access", the MM context and the bearer resources of the 3GPP network in the UE are deleted, and the detach request message is sent to the MME; if the UE determines that the access policy information of the operator is "multi radio access", the MM context of network in the UE is not deleted (that is, the UE is not detached from the 3GPP network), the detach request message is not sent to the MME, and step 1107 is performed.

4) The UE determines whether to detach the UE from the 3GPP network according to the handover or change of the UE in the access network, the terminal capability of the UE, and the access policy information of the operator, in which if the UE determines that the UE is handed over or switched from the 3GPP network to the non-3GPP network, the terminal capability of the UE is "dual radio capability", and the access policy information of the operator is "single radio access", or if the UE determines that the UE is handed over or switched from the 3GPP network to the non-3GPP network, the access policy information of the operator is "multi radio access", and the terminal capability of the UE is "single radio capability", or if the UE determines that the UE is handed over or switched from the 3GPP network to the non-3GPP network, the terminal capability of the UE is "single radio capability", and the access policy information of the operator is "single radio access", the MM context and the bearer resources of the 3GPP network in the UE are deleted, and the detach request message is sent to the MME. If the UE determines that the terminal capability of the UE is "dual radio capability", and the access policy information of the operator is "multi radio access", the MM context of the 3GPP network in the UE is not deleted (that is, the UE is not detached from the 3GPP network), the detach request message is not sent to the MME, and step 1107 is performed.

In step 1104, after the MME receives the detach request message, the MME deletes the MM context of the UE in the MME, initiates a bearer deletion process, and deletes the bearer resources used by the UE on the 3GPP network side.

In this step, the bearer resources used by the UE on the 3GPP network side include the bearer resources used by the UE in the MME, serving GW, and PDN GW.

In step 1105, if the MME finds that the subscription data and the MM context of the UE are deleted, the MME sends a purge UE message to the HSS/AAA server, and then the HSS/AAA server purges the record of the UE, and returns a purge UE Ack message to the MME.

In this step, it is determined whether to delete the subscription data of the UE by the MME according to the actual conditions. This step is optional.

In step 1106, the MME sends a Detach Accept message to the UE.

Steps 1107-1111 are the same as steps 203-207 in FIG. 2.

Step 1103 and step 1107 may be performed at any order.

In this embodiment, it should be noted that, the method in this embodiment is also applicable to the handover or switching of the UE from the non-3GPP network to the 3GPP network.

When the UE is handed over from the non-3GPP network to the 3GPP network, the UE determines whether to detach the UE from the non-3GPP network according to the handover of the UE in the access network, or according to the handover of the UE in the access network and the terminal capability of the UE, or according to the handover of the UE in the access network and the access policy information of the operator, or according to the handover of the UE in the access network, the terminal capability of the UE, and the access policy information of the operator. If yes, the UE sends the detach request message to the non-3GPP GW. The detailed process thereof can be known with reference to the description of the above embodiment.

It should be noted that, in this embodiment, the serving GW and the PDN GW may be configured in different entities or in the same entity. When the serving GW and the PDN GW are configured in the same entity, the messages between the serving GW and the PDN GW are transmitted in the same entity. The HSS and the AAA server may be configured in different entities or in the same entity. If the HSS and the AAA server are configured in different entities, the MME sends the purge UE message to the HSS.

In the embodiments of the present disclosure, if the user detachment is caused by the handover or change of the UE from the 3GPP network to the non-3GPP network, after the user detachment, the process may further include: setting, by the MME of the 3GPP, the state of the UE to an invalid state. Specifically, the process of setting, by the MME of the 3GPP, the state of the UE to an invalid state is implemented as follows.

The MME deletes the subscription date information and the MM context of the UE.

Alternatively, the MME retains the subscription data information of the UE, but sets the state of the MME used by the UE to an invalid state.

Alternatively, the state of the MME used by the UE is set to an invalid value.

Alternatively, the MME retains the subscription data information of the UE, but sets a change flag location of the MME used by the UE to a changed state.

In the embodiments of the present disclosure, if the user detachment is caused by the handover or switching of the UE from the non-3GPP network to the 3GPP network, after the user detachment, the process may further include: setting, by the non-3GPP GW of the non-3GPP, the state of the UE to an invalid state. Specifically, the process of setting, by the non-3GPP GW of the non-3GPP, the state of the UE to an invalid state is implemented as follows.

The non-3GPP GW deletes the subscription data information and the MM context of the UE.

Alternatively, the non-3GPP GW retains the subscription data information of the user, but sets the state of the non-3GPP GW used by the UE to an invalid state.

Alternatively, the address of the non-3GPP GW used by the UE is set to an invalid value.

Alternatively, a non-3GPP GW retains the subscription data information of the user, but sets a change flag position of the non-3GPP GW used by the UE to a changed state.

Figure 12:
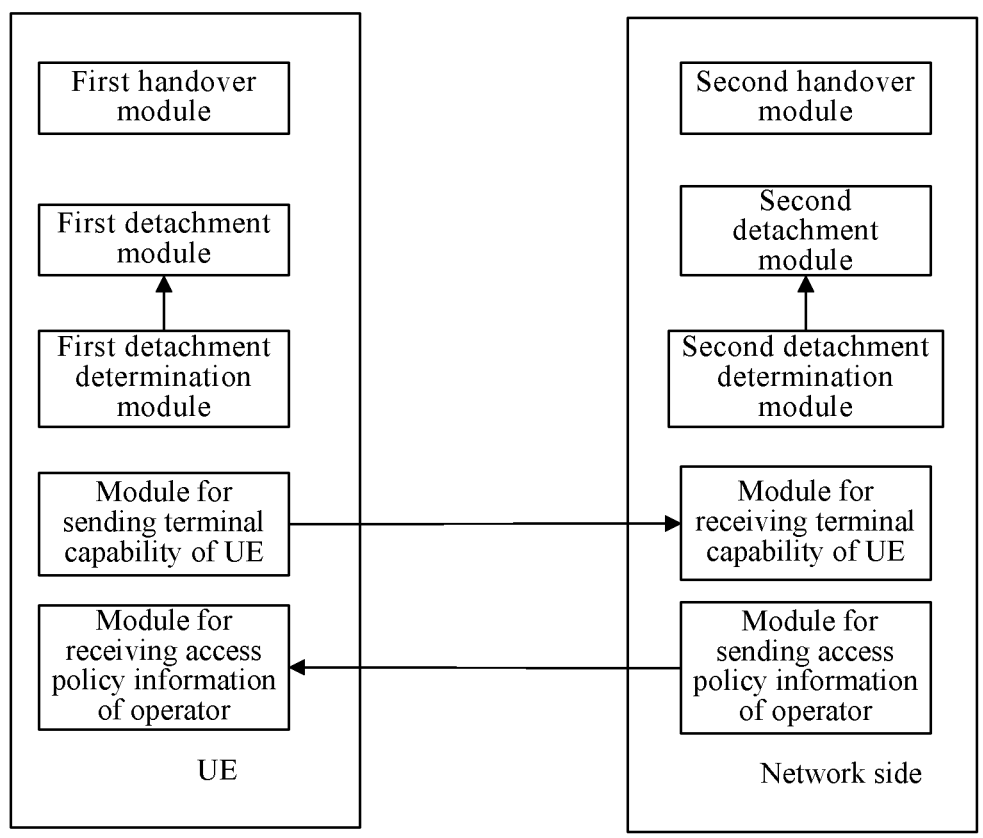
FIG. 12 is a schematic structural view of a system for user detachment when a handover or change occurs in a heterogeneous network according to an embodiment of the present disclosure.

FIG. 12 shows a system for user detachment when a handover or change occurs in a heterogeneous network according to an embodiment of the present disclosure. The system includes a UE and a network side.

The UE is adapted to be handed over or switched from a source network on the network side to a target network.

The network side is adapted to hand over or switch the UE from the source network to the target network to detach the UE from the source network.

The UE may include a first handover or change module, and the network side may include a second handover or change module and a second detachment module.

The first handover or change module is adapted to enable the UE to be handed over or switched from the source network to the target network.

The second handover or change module is adapted to enable the network side to hand over or switch the UE from the source network to the target network.

The second detachment module is adapted to enable the network side to detach the UE from the source network.

Optionally, the UE includes a first detachment module adapted to detach the UE from the source network.

Optionally, the UE includes a first detachment determination module and a second detachment determination module disposed on the network side.

The first detachment determination module is adapted to determine whether to detach the UE from the source network, and if yes, an enable instruction is sent to the first detachment module to enable the first detachment module.

The second detachment determination module is adapted to determine whether to detach the UE from the source network, and if yes, an enable instruction is sent to the second detachment module to enable the second detachment module. The second detachment determination module may be disposed in a network element on a network side, such as an MME, a PDN GW, a serving GW, or an HSS/AAA server.

The UE further includes a module for sending terminal capability of a UE and a module for receiving access policy information of an operator, and the network side further includes a module for receiving the terminal capability of the UE and a module for sending the access policy information of the operator.

The module for sending the terminal capability of the UE is adapted to send the terminal capability of the UE to the network side, and the module for receiving the access policy information of the operator is adapted to receive the access policy information of the operator sent by the network side.

The module for receiving the terminal capability of the UE is adapted to receive the terminal capability of the UE sent by the UE, and the module for sending the access policy information of the operator is adapted to send the access policy information of the operator to the UE.

Based on the solutions for user detachment when a handover or change occurs in a heterogeneous network according to the embodiments of the present disclosure, when the UE is handed over or switched from the source network on the network side to the target network on the network side, the source network can detach the UE from the source network, and the UE can detach the UE from the source network.

It will be apparent to those skilled in the art that various modifications and variations can be made to the present disclosure without departing from the scope of the invention. In view of the foregoing, it is intended that the present disclosure cover modifications and variations of this invention provided that they fall within the scope of the following claims and their equivalents.

What is claimed is:
1. A method comprising:
setting, by a packet data network gateway (PDN GW), a cause information element (IE) to represent that a user equipment's (UE) accessing radio access technology (RAT) is changed from a source network to a destination network if a handover from the source network to the destination network occurs, wherein the source network and the destination network are different access networks; and sending, by the PDN GW, a delete bearer request carrying the cause IE to a network entity of the source network.

2. The method according to claim 1, the network entity of the source network is a serving GW, further comprising:
receiving, by the serving GW, the delete bearer request; and
sending, by the serving GW, the delete bearer request to a mobility management entity (MME).

3. The method according to claim 1, wherein the source network is a 3GPP network and the destination network is a non-3GPP network.

4. A device, comprising:
a processor, and
a non-transitory computer-readable storage medium storing a program to be executed by the processor, the program including instructions for:
setting a cause information element (IE) to represent that a user equipment's (UE) accessing RAT is changed from a source network to a destination network if a handover from the source network to the destination network occurs, wherein the source network and the destination network are different access networks; and
sending a delete bearer request carrying the cause IE to a network entity of the source network.

5. The device according to claim 4, wherein the program further comprises instructions for:
receiving a message from the destination network when a handover from the source network to the destination network; and
in response to the message, sending the delete bearer request to a mobility management entity (MME).

6. The device according to claim 4, wherein the source network is a 3 GPP network and the destination network is a non-3GPP network.

7. A method for detaching a user equipment (UE) when a handover from a source network to a destination network occurs, comprising:
receiving, by a mobility management entity (MME) of the source network, a delete bearer request from a network entity of the source network which carries a cause information element (IE), wherein the cause IE indicates the UE handovers from the source network to the destination network and wherein the source network and the destination network are different access networks;
deleting, by the MME, bearer resources of the UE; and
detaching, by the MME, the UE from the source network when all the bearer resources of the UE are deleted.

8. The method according to claim 7, wherein the cause IE is set to "UE's accessing radio access technology (RAT) changed from a source network to a destination network".

9. The method according to claim 7, wherein detaching, by the MME, the UE from the source network further comprises:
detaching, by the MME, the UE from the source network without sending a detach request message to the UE.

10. The method according to claim 7, wherein the source network is a 3GPP network and the destination network is a non-3GPP network.

11. A mobility management entity (MME), configured to:
receive a delete bearer request from a network entity of a source network when a handover from the source network to a destination network occurs, wherein the delete bearer request carries a cause information element (IE) which indicates user equipment (UE) handovers from the source network to the destination network;
delete bearer resources of the UE; and
detach the UE from the source network when all the bearer resources of the UE are deleted.

12. The MME according to claim 11, wherein the cause IE is set to "UE's accessing radio access technology (RAT) changed from a source network to a destination network".

13. The MME according to claim 11, wherein the MME is configured to detach the UE from the source network without sending a detach request message to the UE.

14. The MME according to claim 11, wherein the source network is a 3GPP network and the destination network is a non-3GPP network.

15. A system, comprising a packet data network gateway (PDN GW), and a mobility management entity (MME), wherein:
the PDN GW is adapted to set a cause information element (IE) to represent that a user equipment's (UE) accessing radio access technology (RAT) is changed from a source network to a destination network if a handover from the source network to the destination network occurs, and send a delete bearer request carrying the cause IE to the MME; and
the MME is adapted to delete a bearer resource of the UE and delete a mobility management (MM) context of the UE.

16. The system according to claim 15, wherein the system further comprises a serving gateway (GW), and sending the delete bearer request carrying the cause IE to the MME, comprising:
the PDN GW sends the delete bearer request to the serving GW; and
the serving GW sends the delete bearer request to the MME.

17. The system according to claim 15, wherein the source network is a 3GPP network and the destination network is a non-3GPP network.

18. A method comprising:
setting, by a packet data network gateway (PDN GW), a cause information element (IE) to represent that a user equipment's (UE) accessing RAT is changed from a source network to a destination network if a handover from a source to a destination network occurs, wherein the source network and the destination network are different access networks; and
sending, by the PDN GW, a delete bearer request carrying the cause IE to the MME; and
deleting, by the MME, a bearer resource of the UE and a mobility management (MM) context of the UE.

19. The method according to claim 18, sending, by the PDN GW, a delete bearer request carrying the cause IE to the MME, comprising:
sending, by the PDN GW, the delete bearer request to a serving GW;
sending, by the serving GW, the delete bearer request to the MME.

20. The method according to claim 18, wherein the source network is a 3GPP network and the destination network is a non-3GPP network.

* * * * *